(12) United States Patent
Kitada et al.

(10) Patent No.: US 10,404,602 B2
(45) Date of Patent: Sep. 3, 2019

(54) TRANSMISSION APPARATUS AND TRANSMISSION PROCESSING METHOD

(71) Applicant: FUJITSU LIMITED, Kawasaki-shi, Kanagawa (JP)

(72) Inventors: Atsushi Kitada, Kawasaki (JP); Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/685,365

(22) Filed: Aug. 24, 2017

(65) Prior Publication Data

US 2018/0091430 A1    Mar. 29, 2018

(30) Foreign Application Priority Data

Sep. 23, 2016 (JP) ................. 2016-185885

(51) Int. Cl.

| | |
|---|---|
| *H04L 12/815* | (2013.01) |
| *H04L 12/819* | (2013.01) |
| *H04L 12/873* | (2013.01) |
| *H04L 12/863* | (2013.01) |
| *H04L 12/931* | (2013.01) |
| *H04L 12/935* | (2013.01) |

(52) U.S. Cl.
CPC ............ *H04L 47/22* (2013.01); *H04L 47/215* (2013.01); *H04L 47/527* (2013.01); *H04L 47/621* (2013.01); *H04L 49/206* (2013.01); *H04L 49/3018* (2013.01)

(58) Field of Classification Search
CPC .. H04L 47/10; H04W 28/02; H04W 28/0205; H04W 28/021; H04W 28/0247; H04W 28/0252; H04W 28/0257; H04W 28/0263; H04W 28/0268; H04W 28/0273
See application file for complete search history.

(56) References Cited

U.S. PATENT DOCUMENTS

| | | | | |
|---|---|---|---|---|
| 7,002,914 | B2 * | 2/2006 | Cloonan | ................. H04L 47/10 370/232 |
| 7,054,626 | B2 * | 5/2006 | Rossmann | ............ E21B 43/121 455/422.1 |
| 7,483,378 | B2 * | 1/2009 | Chikamatsu | ............ H04L 47/10 370/235.1 |
| 2004/0260829 | A1 | 12/2004 | Husak et al. | |
| 2010/0091783 | A1 | 4/2010 | Venables | |

(Continued)

FOREIGN PATENT DOCUMENTS

| | | |
|---|---|---|
| JP | 2005-510893 | 4/2005 |
| JP | 2014-135581 | 7/2014 |

(Continued)

*Primary Examiner* — Sharad Rampuria
(74) *Attorney, Agent, or Firm* — Staas & Halsey LLP

(57) ABSTRACT

There is provided a transmission apparatus including at least one memory in which a first data including a first destination information and a second data including a second destination information are stored, and at least one processor coupled to the at least one memory and the at least one processor configured to control the at least one memory to output the first data and the second data stored in the at least one memory according to a set rate, and control the set rate to output one of the first data and the second data according to a priority degree.

9 Claims, 30 Drawing Sheets

(56) References Cited

U.S. PATENT DOCUMENTS

| | | | |
|---|---|---|---|
| 2014/0192819 A1* | 7/2014 | Nishimura | H04L 47/527 370/412 |
| 2015/0016266 A1 | 1/2015 | Dumitrescu et al. | |
| 2015/0124602 A1 | 5/2015 | Oishi et al. | |

FOREIGN PATENT DOCUMENTS

| | | |
|---|---|---|
| JP | 2015-19369 | 1/2015 |
| JP | 2015-91061 | 5/2015 |
| JP | 2015-109672 | 6/2015 |

* cited by examiner

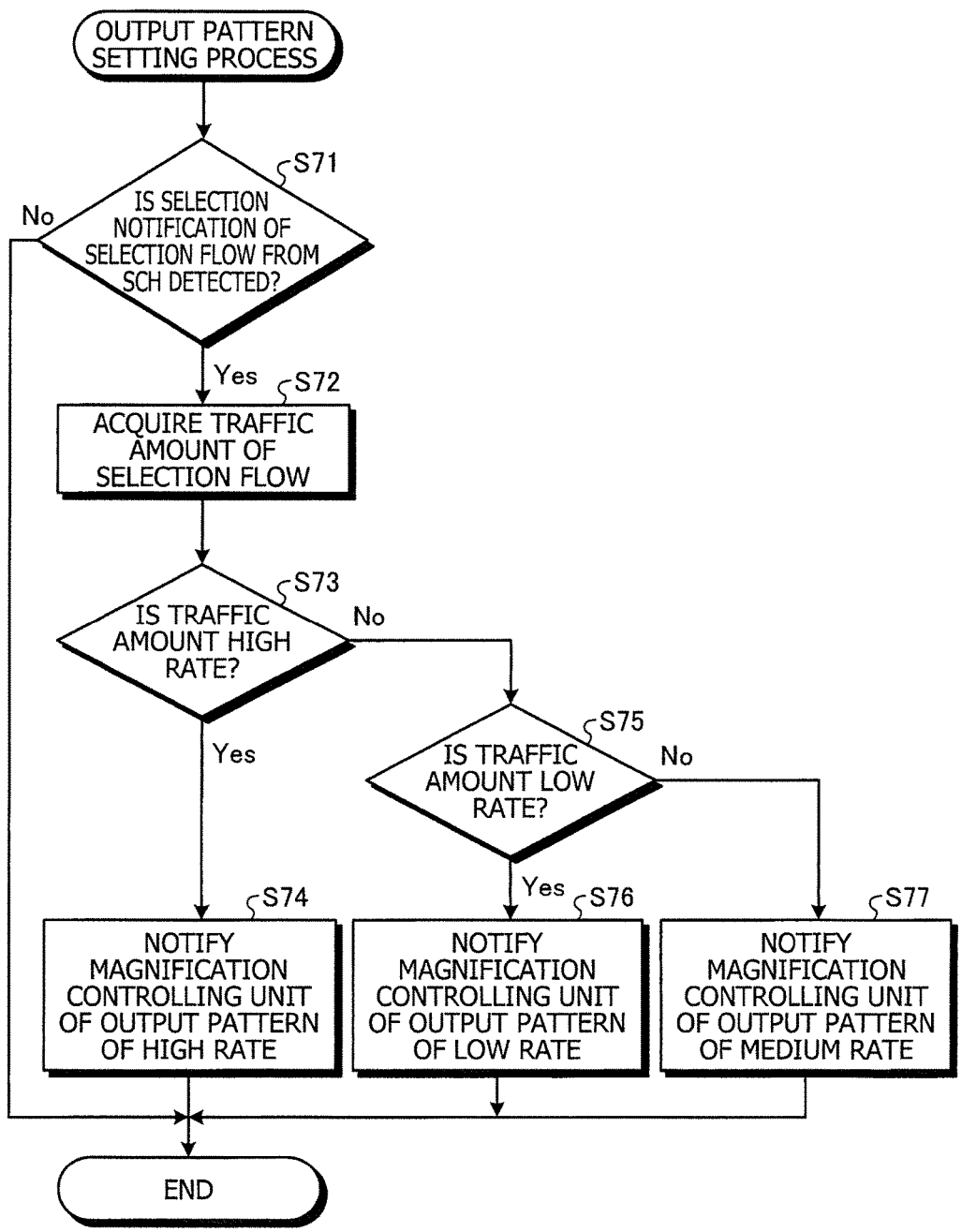

TRANSMISSION APPARATUS AND TRANSMISSION PROCESSING METHOD

CROSS-REFERENCE TO RELATED APPLICATION

This application is based upon and claims the benefit of priority of the prior Japanese Patent Application No. 2016-185885, filed on Sep. 23, 2016, the entire contents of which are incorporated herein by reference.

FIELD

The embodiment discussed herein is related to a transmission apparatus and a transmission processing method.

BACKGROUND

In recent years, in transmission systems, the number of users aggregating on stations and the amount of data in communication are in an increasing trend together with widespread use of smartphones and so forth and diversification of services using the Internet. A transmission apparatus for use with a transmission system identifies the priority degree in response to a data type and executes a data process in response to the priority degree, for example, in order to simultaneously process various data of sound whose data delay is not permitted or mails whose data delay is permitted to some degree.

In a transmission apparatus, high speed processing of data may be demanded. A data plane process such as flow identification, destination search, quality of service (QoS) control and so forth of a packet is implemented by hardware such as, a field programmable gate array (FPGA). Further, in recent years, together with improvement of central processing unit (CPU) performances, attention is paid to network functions virtualization (NFV) that makes network design and construction flexible by executing network functions on a general-purpose server. However, it is realistically difficult as yet to perform packet processing, for example, exceeding 100 Gbps fully by software. Therefore, in recent years, also it is investigated to implement, in a transmission apparatus, a scheduler function for controlling an output amount of packets based on a contract area or a priority degree by software while, for example, inputting and outputting functions for each packet are implemented by hardware.

FIG. 29 is an explanatory view depicting an example of a shaping function in a conventional transmission apparatus. A transmission apparatus 200 may include an input processing unit 201, a queue management unit 202, an output processing unit 203 and a scheduler 204. The input processing unit 201 may be a processing unit that identifies an input flow. The queue management unit 202 may manage a plurality of queues 202A and a plurality of shaper 202B. Each queue 202A may store one or more input flows for each flow identifier (ID). Each shaper 202B may be disposed individually for a queue 202A and shape and output an input flow stored in the queue 202A. The output processing unit 203 may output a shaped and outputted flow. The scheduler 204 may provide a fixed readout allowable amount (credit) to each of the plurality of queues 202A. The queue management unit 202 may read out, from the plurality of queues 202A, one or more packets consuming the readout allowable amount (credit) in an order in which readout conditions relating to the readout allowable amount (credit) for each queue 202A and the data amount of one or more packets accumulated for each queue 202A are satisfied.

In the transmission apparatus 200, for example, the input processing unit 201, the queue management unit 202 and the output processing unit 203 may be configured from hardware, and the scheduler 204 may be configured from software. According to the transmission apparatus 200, while implementation of given functions by hardware may be achieved, improvement of functions of the scheduler 204 by software may be achieved.

Examples of related art include disclosed in Japanese Laid-Open Patent Application No. 2014-135581, Japanese Laid-Open Patent Application No. 2015-19369, Japanese Laid-Open Patent Application No. 2015-109672, Japanese Laid-Open Patent Application No. 2015-91061 or Japanese National Publication of International Patent Application No. 2005-510893.

SUMMARY

According to an aspect of the embodiment, a transmission apparatus includes at least one memory in which a first data including a first destination information and a second data including a second destination information are stored, and at least one processor coupled to the at least one memory and the at least one processor configured to control the at least one memory to output the first data and the second data stored in the at least one memory according to a set rate, and control the set rate to output one of the first data and the second data according to a priority degree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 23 is a flow chart illustrating an example of processing action of a determination unit relating to an output pattern determination process;

DESCRIPTION OF EMBODIMENTS

Although, in the transmission apparatus 200, it is possible to generalize the scheduler 204 because it is implemented by software, the queue management unit 202 may be implemented by hardware "for exclusive use" that reads out packets in response to the readout allowable amount from the scheduler 204. Where the queue management unit 202 is configured, for example, in accordance with a specification in which up to four priority classes are involved, a flow is not mappable to five or more classes. For example, in the transmission apparatus 200, it is difficult for the scheduler 204 to implement priority control of an arbitrary priority class due to hardware constraints.

In the following, embodiments of the technology that makes priority control of an arbitrary priority class possible are described in detail with reference to the drawings. It is to be noted that the disclosed technology is not restricted by the embodiments. Further, the embodiments described below may be combined suitably within a range within which they do not cause any contradiction.

First Embodiment

Figure 1:
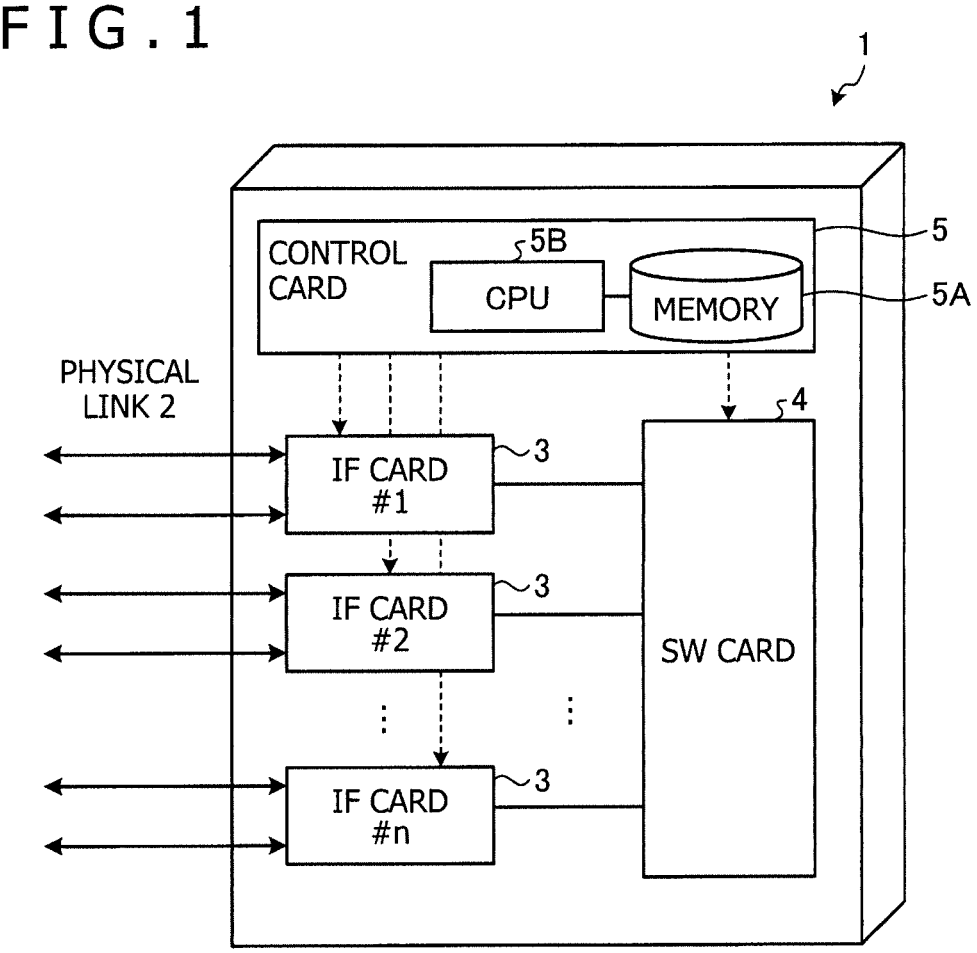
FIG. 1 is an explanatory view depicting an example of a hardware configuration of a transmission apparatus of a first embodiment.

FIG. 1 is an explanatory view depicting an example of a hardware configuration of a transmission apparatus 1 of the first embodiment. The transmission apparatus 1 depicted in FIG. 1 is coupled for communication with different transmission apparatus, for example, through physical links 2 such as an optical fiber. The transmission apparatus 1 is a transmission apparatus that transmits a packet in which various data such as audio or a mail collected from a terminal apparatus are placed to a different transmission apparatus or a different terminal apparatus. It is to be noted that the transmission apparatus 1 is, for example, where the terminal apparatus is a wireless terminal, a base station or the like that is coupled by wireless coupling to the wireless terminal and accommodates the wireless terminal. Alternatively, the transmission apparatus 1 may be a switch apparatus such as a layer 2 switch or a router. Further, a packet is a transmission unit of data (information) to be transmitted, and although an Ethernet (registered trademark) frame is available as an example of the packet, the packet is not limited to this and may be any other frame such as an Internet protocol (IP) packet.

The transmission apparatus 1 depicted in FIG. 1 includes a plurality of IF cards 3 of #1 to #n, a switch (SW) card 4, and a control card 5. Each of the IF cards 3 is a card that has a built-in communication interface for coupling to the physical link 2. The SW card 4 is a card for switchably coupling the plurality of IF cards 3. The control card 5 is a card for controlling the entire transmission apparatus 1. The control card 5 includes a memory 5A and a CPU 5B. The memory 5A is an area for storing various kinds of information. The CPU 5B controls the entire control card 5.

Figure 2:
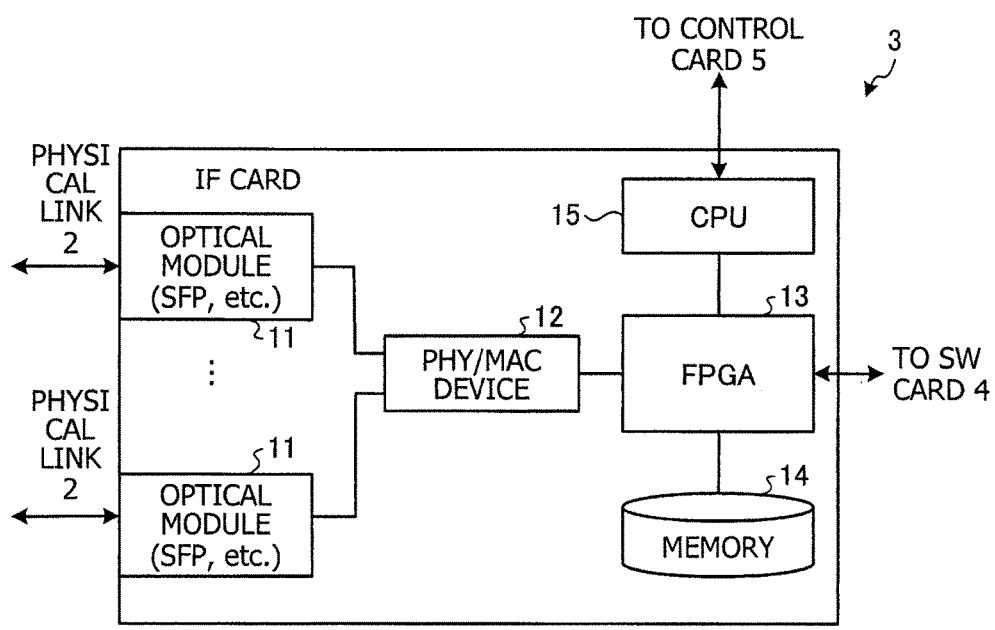
FIG. 2 is an explanatory view depicting an example of a hardware configuration of an interface (IF) card.

FIG. 2 is an explanatory view depicting an example of a hardware configuration of an IF card. The IF card may be the IF card 3 illustrated in FIG. 1. The IF card 3 depicted in FIG. 2 includes a plurality of optical modules 11, a physical layer/media access control (PHY/MAC) device 12, an FPGA 13, a memory 14, and a CPU 15. Each of the optical modules 11 has a function for converting an optical signal from the physical link 2 into an electric signal and another function for converting an electric signal from the PHY/MAC device 12 into an optical signal and outputting the optical signal. The PHY/MAC device 12 executes an establishing process for coupling to the physical link 2, a distribution process of packets to the plurality of optical modules 11 and so forth. The PHY/MAC device 12 outputs a packet from any of the plurality of optical modules 11 to the FPGA 13 and outputs a packet from the FPGA 13 to any of the plurality of optical modules 11. The FPGA 13 is hardware for universal use. It is to be noted that the hardware may be implemented, for example, by an application specific integrated circuit (ASIC) in place of the FPGA 13. The memory 14 is an area for storing various kinds of information. The CPU 15 controls the entire IF card 3.

Figure 3:
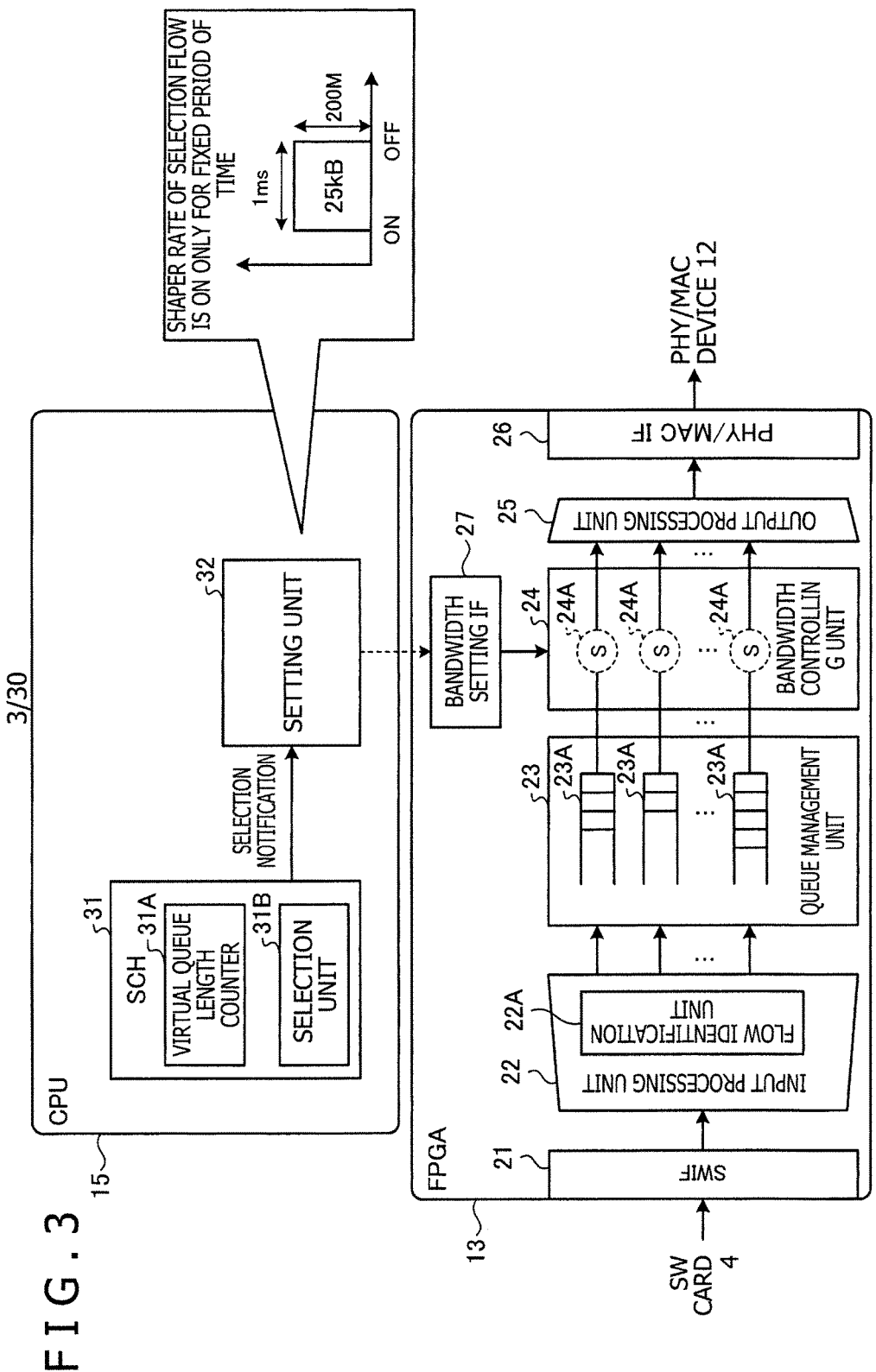
FIG. 3 is an explanatory view depicting an example of an FPGA and a CPU in an IF card.

FIG. 3 is an explanatory view depicting an example of an FPGA and a CPU in an IF card. The FPGA, the CPU, and the IF card may be the FPGA 13, the CPU 15, and the IF card 3, respectively, illustrated in FIG. 2. The FPGA 13 depicted in FIG. 3 includes a SWIF 21, an input processing unit 22, a queue management unit 23, a bandwidth controlling unit 24, an output processing unit 25, a PHY/MACIF 26, and a bandwidth setting IF 27. The SWIF 21 is an IF for coupling to the SW card 4. The input processing unit 22 processes, for example, an ingress packet. The input processing unit 22 includes a flow identification unit 22A for identifying a user flow with a flow ID in an input packet. It is to be noted that the user flow is a flow of data, for example, from a specific user to another specific user.

The queue management unit 23 is a function for distributing an output queue 23A for each user flow to which an input packet belongs and placing input packets of the user flow into the output queue 23A. The output queue 23A is a storage unit such as a first in first out (FIFO). The bandwidth controlling unit 24 has a shaper function for adjusting the interval between packet outputs of the output queue 23A for each user flow using, for example, a token bucket method. The bandwidth controlling unit 24 includes a shaper 24A for each output queue 23A and controls the shaper 24A for the output queue 23A in response to a set rate from the CPU 15. The shaper 24A includes a token bucket 24B (refer to FIG. 4) for accumulating tokens therein and controls readout of packets in the output queue 23A corresponding to a selection flow in response to a token remaining amount in the token bucket 24B. Further, the shaper 24A adjusts the output interval of packets with an addition rate at which a token is to be added to the token bucket 24B. Then, the bandwidth controlling unit 24 controls the shaper 24A for each output queue 23A to select a corresponding output queue 23A from among the plurality of output queues 23A and outputs packets in the selected output queue 23A to the output processing unit 25. The output processing unit 25 processes, for example, egress packets. The PHY/MACIF 26 is an IF for coupling to the PHY/MAC device 12. The bandwidth setting IF 27 is an IF for setting a shaping rate of the bandwidth controlling unit 24 in response to a set rate from the CPU 15.

The CPU 15 includes a scheduler (SCH) 31 and a setting unit 32. The SCH 31 has, for example, a priority controlling function, a bandwidth controlling function and an output queue selecting function for determining, from among the plurality of output queues 23A, the output queue 23A of an output target efficiently and at a high speed. The priority controlling function is a function for selecting an output timing of a packet in response to a priority degree of a user flow (destination information). It is to be noted that the priority degree is an output priority degree of a user flow according to class information of a packet, a token state and so forth. The bandwidth controlling function is a function for controlling the shaping rate of the bandwidth controlling unit 24 in the FPGA 13. The output queue selection function is a function for selecting an output queue 23A of an output target from among the plurality of output queues 23A, for example, based on a round-robin method. The SCH 31 consumes a token remaining amount in the token bucket 24B to read out a packet from the output queue 23A corresponding to the selection flow through the shaper 24A corresponding to the selection flow.

The SCH 31 includes a virtual queue length counter 31A and a selection unit 31B. The virtual queue length counter 31A counts a virtual queue length for each output queue 23A. The selection unit 31B notifies the setting unit 32 of a selection notification of a user flow of an output target, for example, of a selection flow.

The setting unit 32 sets a shaping rate of a shaper 24A corresponding to a selection flow in response to a selection notification. The shaping rate of a selection flow is a set rate for controlling the shaper 24A corresponding to the output queue 23A of the selection flow. The shaping rate is, for example, equivalent to an output pattern where the amount of set rate is 200 Mbps and an ON section that is an ON duration of the amount of set rate is 1 millisecond. In this case, the shaping rate is equivalent to credit supply of 25 k bytes. The setting unit 32 may adjust the shaping rate for each shaper 24A corresponding to an output queue 23A in the bandwidth controlling unit 24 by adjusting the amount of set rate and the ON section of the amount of set rate.

Figure 4:
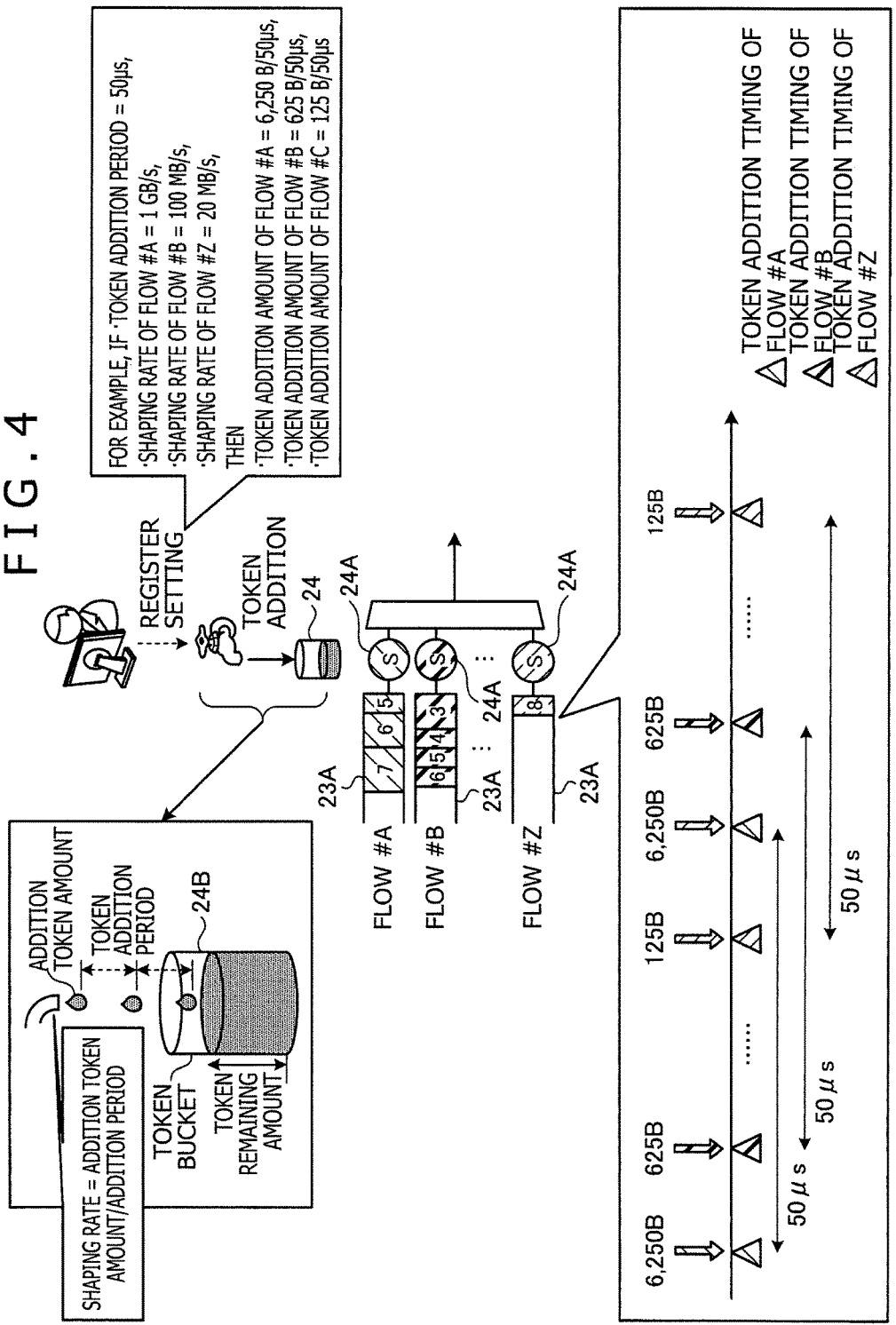
FIG. 4 is an explanatory view illustrating an example of a token bucket method of a bandwidth controlling unit.

FIG. 4 is an explanatory view illustrating an example of a token bucket method of a bandwidth controlling unit. The bandwidth controlling unit may be the bandwidth controlling unit 24 illustrated in FIG. 3. The bandwidth controlling unit 24 includes a token bucket 24B for each output queue 23A, and may add, for each token addition period, an addition token amount into the token bucket 24B and output packets from the output queue 23A within a range of the token remaining amount in the token bucket 24B. The shaping rate is, for example, an addition token amount÷token addition period for each addition period. The token addition period is fixed, and the addition token amount is adjustable for each user flow. The token addition period is hereinafter referred to merely as addition period.

For example, where the addition period is 50 microseconds and the addition token amount of a flow #A is 6250 bytes, since 6250 bytes are added into the token bucket 24B after every addition period, the shaping rate of the flow #A is, for example, 6250 bytes/50 microseconds=1 Gbps. On the other hand, where the addition token amount of a flow #B is 625 bytes, since 625 bytes are added into the token bucket 24B after every addition period, the shaping rate of the flow #B is, for example, 625 bytes/50 microseconds=100 Mbps. Further, where the addition token amount of a flow #Z is 125 bytes, since 125 bytes are added into the token bucket 24B after every addition period, the shaping rate of the flow #Z is, for example, 125 bytes/50 microseconds=20 Mbps.

The transmission apparatus 1 of the first embodiment sets or changes the shaping rate of a selection flow by adjusting the amount of set rate and the output ON section for each selection flow. The transmission apparatus 1 adjusts the addition token amount for each addition period of a selection flow in response to the shaping rate for each selection flow. As a result, since the transmission apparatus 1 may adjust the shaping rate for each selection flow, even if it has constraints in hardware, it may implement priority control that flexibly copes with a variation of a priority class.

Figure 5A:
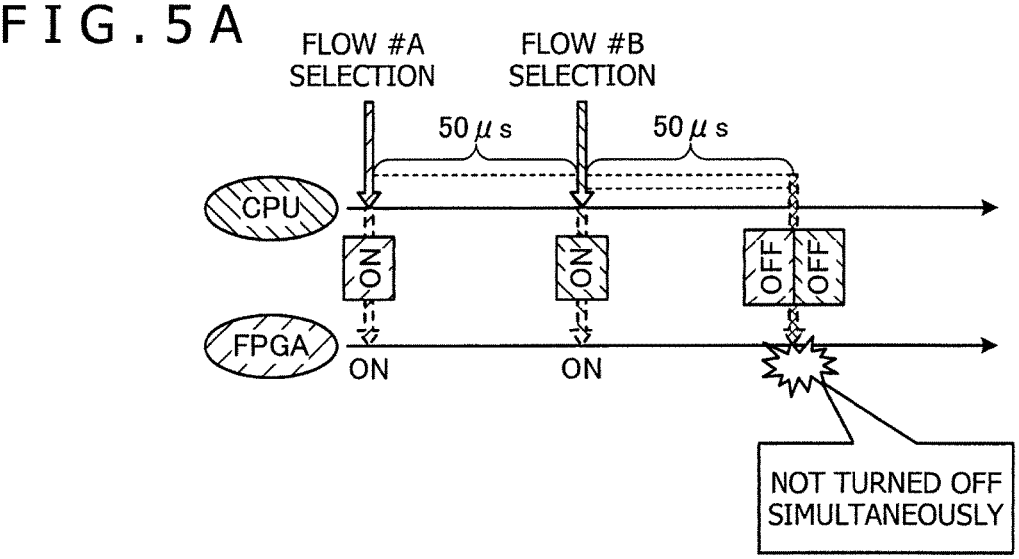
FIG. 5A is an explanatory view illustrating an example of conflict occurrence between setting timings of a CPU and an FPGA.

However, in the transmission apparatus 1 of the first embodiment, for example, when the amount of set rate and the output ON section are adjusted, conflict between setting timings of selection flows sometimes occurs. FIG. 5A is an explanatory view illustrating an example of conflict occurrence between setting timings of a CPU and an FPGA. The CPU and the FPGA may be the CPU 15 and the FPGA 13, respectively, illustrated in FIG. 2. Note that it is assumed that, for example, the addition period is 50 microseconds, that the output ON section of the flow #A is 100 microseconds and that the output ON section of the flow #B is 50 microseconds. If a selection notification of the flow #A from the SCH 31 is detected, the setting unit 32 turns on the shaper 24A of the flow #A of the bandwidth controlling unit 24 and turns off the shaper 24A after lapse of 100 microseconds from starting of the turning on. On the other hand, if a selection notification of the flow #B from the SCH 31 is detected, the setting unit 32 turns on the shaper 24A of the flow #B and turns off the shaper 24A after lapse of 50 microseconds from starting of the turning on. However, although conflict that the flows #A and #B are turned off simultaneously occurs, it is not possible for the bandwidth controlling unit 24 to turn off the flows #A and #B simultaneously. Accordingly, it may be demanded to suppress conflict of setting timings.

Figure 5B:
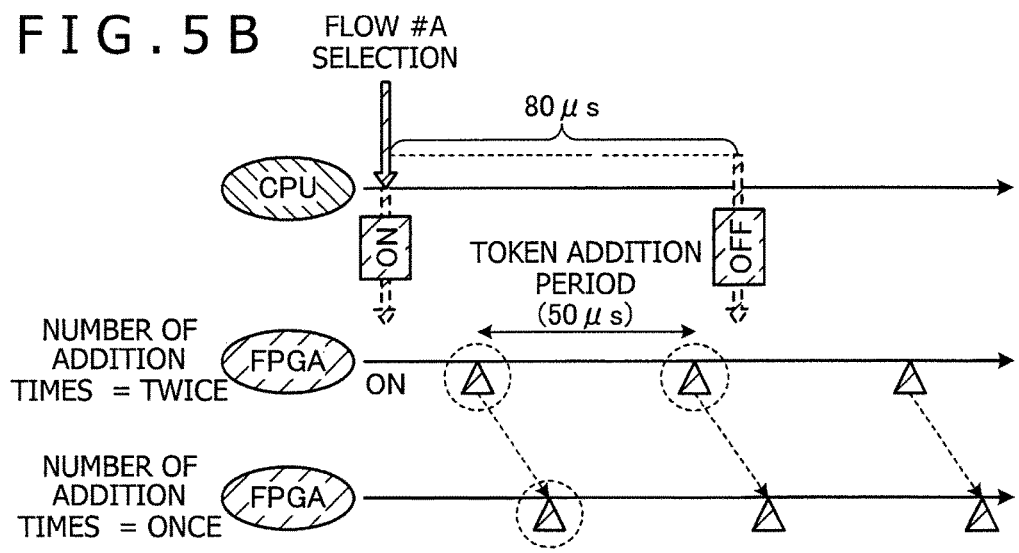
FIG. 5B is an explanatory view illustrating an example of displacement in token addition timing between a CPU and an FPGA.

FIG. 5B is an explanatory view illustrating an example of displacement in token addition timing between a CPU and an FPGA. The CPU and the FPGA may be the CPU 15 and the FPGA 13, respectively, illustrated in FIG. 2. For example, it is assumed that the addition period is 50 microseconds and the output ON section of the flow #A is 80 microseconds. For example, if an addition period comes twice within an output ON section of the flow #A, the number of token addition times is two. However, if the FPGA 13 is different in timing of an addition period, for example, within an output ON section of the flow #A, an addition period comes only once, and in this case, the number of token addition times is one. For example, the FPGA 13 suffers from displacement in number of token addition times within an output ON section arising from the timing of an addition period. Accordingly, actually it may be demanded to suppress displacement in number of token addition times arising from the timing of an addition period.

Therefore, an embodiment of the transmission apparatus 1 that suppresses conflict in setting timing and displacement in token addition timing is described below as the second embodiment. It is to be noted that same elements to those of the transmission apparatus 1 of the first embodiment are denoted by same reference symbols and overlapping description of the configuration and action of them is omitted herein.

Second Embodiment

Figure 6:
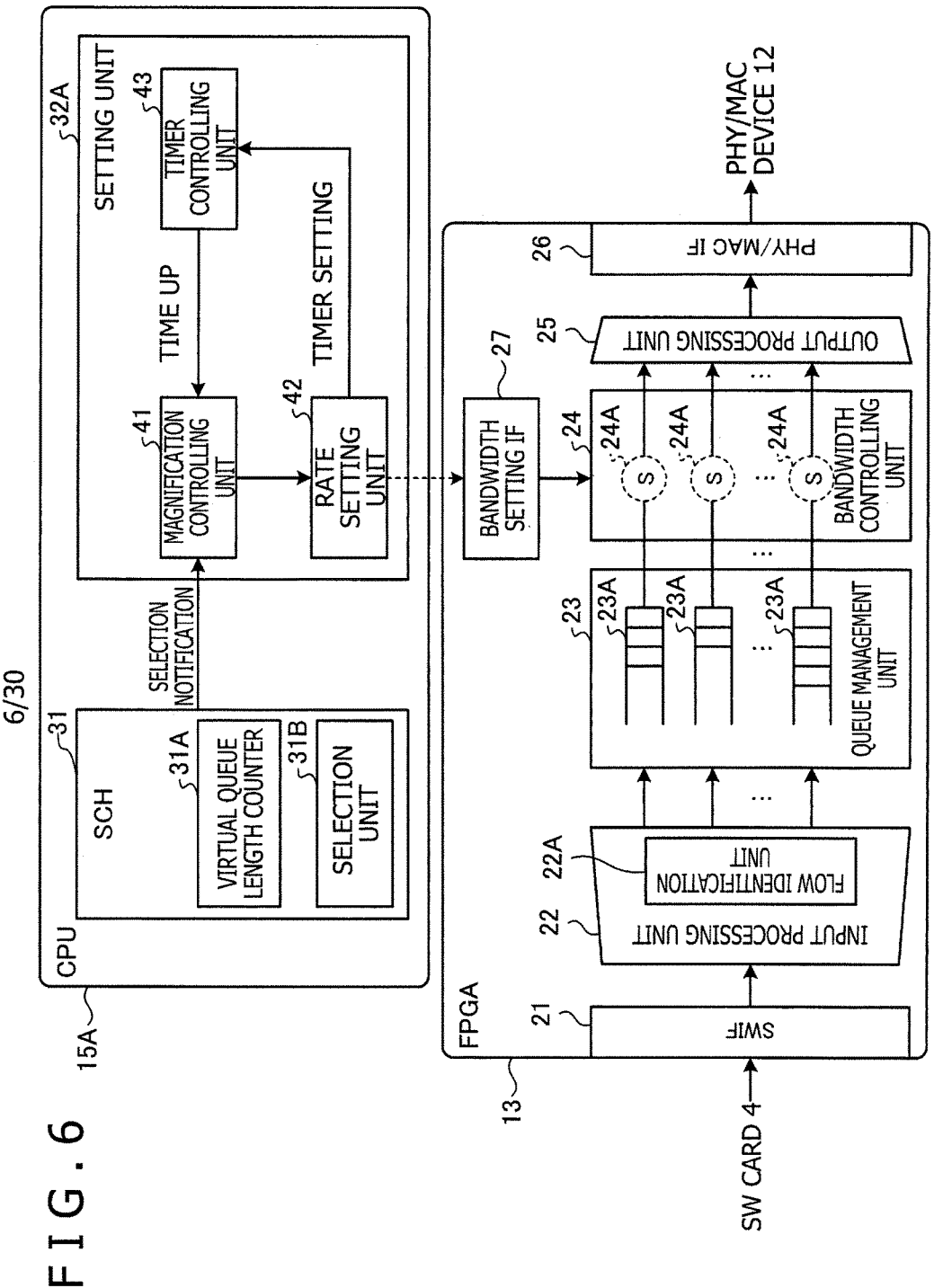
FIG. 6 is an explanatory view depicting an example of an FPGA and a CPU in an IF card of a second embodiment.

FIG. 6 is an explanatory view depicting an example of an FPGA and a CPU in an IF card of the second embodiment. A setting unit 32A depicted in FIG. 6 includes a magnification controlling unit 41, a rate setting unit 42 and a timer controlling unit 43. The magnification controlling unit 41 controls the setting magnification for the shaping rate of the shaper 24A of a selection flow. The rate setting unit 42 sets a shaping rate of the shaper 24A of the selection flow to the bandwidth setting IF 27 based on the setting magnification for the shaping rate of the selection flow. The timer controlling unit 43 is a timer for monitoring an end of an output ON section of the shaping rate of the selection flow, for example, turning off of the output.

If a selection notification of a selection flow from the SCH 31 is detected, the magnification controlling unit 41 increments the setting magnification for the shaping rate of the shaper 24A of the selection flow by +1 and notifies the rate setting unit 42 of the setting magnification after incremented by +1. It is to be noted that the shaping rate has a fixed output pattern. The rate setting unit 42 sets a shaping rate to the bandwidth setting IF 27 in response to the setting magnification for the shaping rate of the selection flow from the magnification controlling unit 41. Further, when the rate setting unit 42 sets the shaping rate of the selection flow to the bandwidth setting IF 27, it notifies the timer controlling unit 43 of the timer setting of the selection flow.

If a timer setting of a selection flow is detected, the timer controlling unit 43 activates an ON section timer for the selection flow and notifies, when the ON section timer times out, the magnification controlling unit 41 of the time up of the selection flow. It is to be noted that the ON section timer is a timer for monitoring an end timing, for example, turning off, of an output ON section of the shaping rate. The magnification controlling unit 41 decrements the setting magnification by 1 in response to the time up of the selection flow from the timer controlling unit 43. The magnification controlling unit 41 notifies the rate setting unit 42 of the setting magnification for the selection flow after decremented by 1. The rate setting unit 42 sets a shaping rate of the selection flow to the bandwidth setting IF 27 based on the setting magnification after decremented by 1.

Figure 7A:
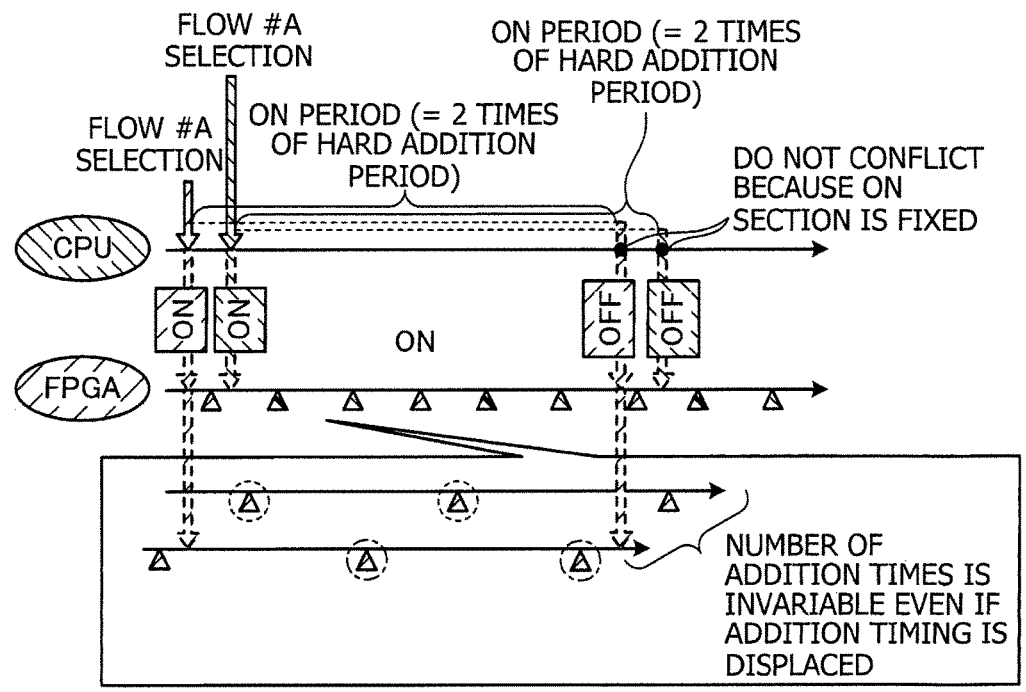
FIG. 7A is an explanatory view illustrating an example of conflict suppression of setting timings and displacement suppression of token addition timings of a CPU and an FPGA.

FIG. 7A is an explanatory view illustrating an example of conflict suppression of setting timings and displacement suppression of token addition timings of a CPU and an FPGA. The CPU and the FPGA may be a CPU 15A and the FPGA 13, respectively, illustrated in FIG. 6. The setting unit 32A makes the addition period fixed and sets the output ON section of a selection flow to N times the addition period, for example, to twice, and then fixes the output ON section. Even if the setting unit 32A detects, during an output ON section of the selection flow #A for the first time, a selection notification of the selection flow #A for the second time, for example, detects turning ON of the selection flow #A, since the output ON section is fixed, conflict of an OFF state between the selection flow #A for the first time and the selection flow #A for the second time may be suppressed. Besides, since the output ON section is fixed, difference in the number of addition times caused by displacement in token addition timing may be suppressed.

Figure 7B:
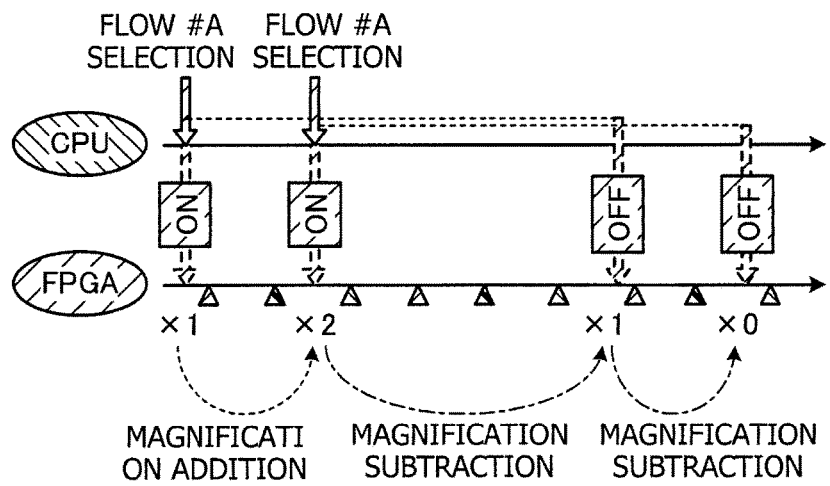
FIG. 7B is an explanatory view illustrating an example of token addition timings of a CPU and an FPGA.

FIG. 7B is an explanatory view illustrating an example of token addition timings of a CPU and an FPGA. The CPU and the FPGA may be the CPU 15A and the FPGA 13, respectively, illustrated in FIG. 6. If a selection notification (output ON) of the selection flow #A for the first time is detected, the setting unit 32A sets the setting magnification for the shaping rate of the selection flow #A for the first time to one time. It is to be noted that, when the setting magnification is one time, an addition token amount by one time is added in response to arrival of an addition period. Further, if a selection notification (output ON) of the selection flow #A for the second time is detected during the output ON section of the selection flow #A for the first time, the setting unit 32A increments the setting magnification for the shaping rate of the selection flow #A by +1 and sets the setting magnification to two times. It is to be noted that, when the setting magnification is two times, an addition token amount by two times is added in response to an arrival of an addition period. Then, if an output OFF state of the selection flow #A for the first time is detected, the setting unit 32A decrements the setting magnification for the shaping rate of the selection flow #A by 1 and sets the setting magnification to one time. Further, if an output OFF state of the selection flow #A for the second time is detected, the setting unit 32A decrements the setting magnification for the shaping rate of the selection flow #A by 1 and sets the setting magnification to zero times.

Figure 8:
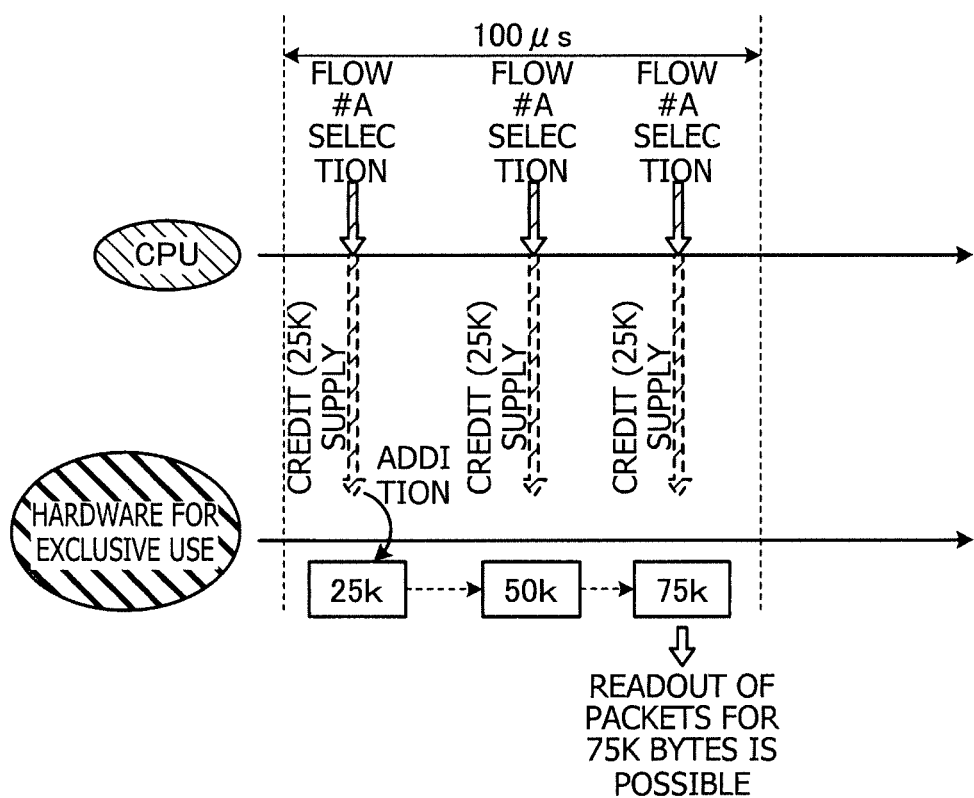
FIG. 8 is an explanatory view illustrating an example of token addition timings of a CPU and hardware for exclusive use of a conventional transmission apparatus.
Figure 29:
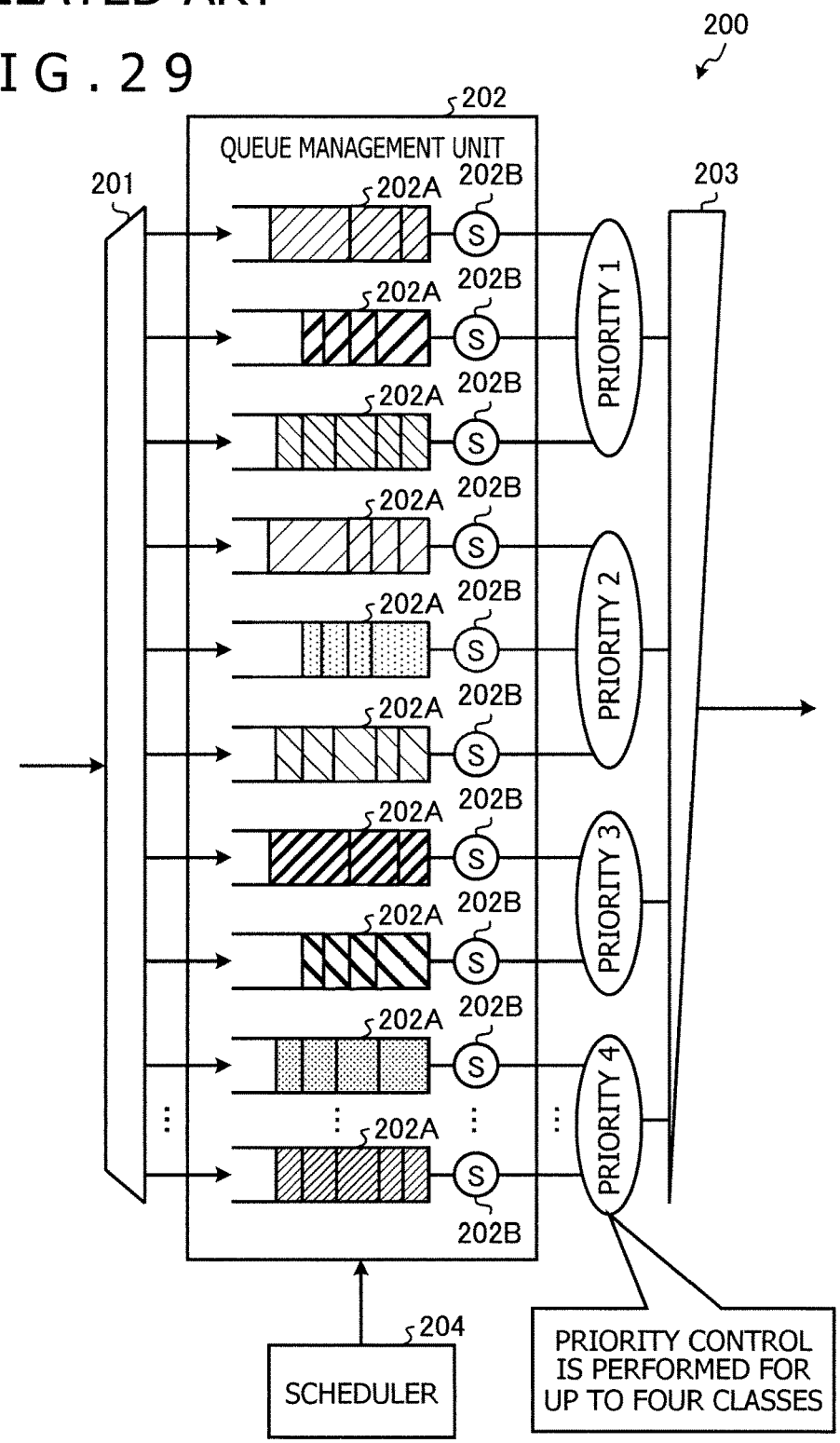
FIG. 29 is an explanatory view depicting an example of a shaping function in a conventional transmission apparatus.

FIG. 8 is an explanatory view illustrating an example of token addition timings of a CPU and hardware for exclusive use of a conventional transmission apparatus. The transmission apparatus may be the transmission apparatus 200 illustrated in FIG. 29. It is assumed that the scheduler 204 of the conventional transmission apparatus 200 detects selection of the selection flow #A by three times within a section of 100 microseconds. When selection of the selection flow #A for the first time is detected, the scheduler 204 adds the credit (25 k bytes) to the queue management unit 202 in the hardware for exclusive use. Further, when selection of the selection flow #A for the second time is detected, the scheduler 204 adds the credit (25 k bytes) to the queue management unit 202, and consequently, the total credit amount becomes 50 k bytes. Further, when the selection of the selection flow #A for the third time is detected, the scheduler 204 adds the credit (25 k bytes) to the queue management unit 202, and consequently, the total credit amount becomes 75 k bytes. As a result, from the hardware for exclusive use, packets of the selection flow #A for 75 k bytes may be read out, for example, within a section of 100 microseconds.

Figure 9:
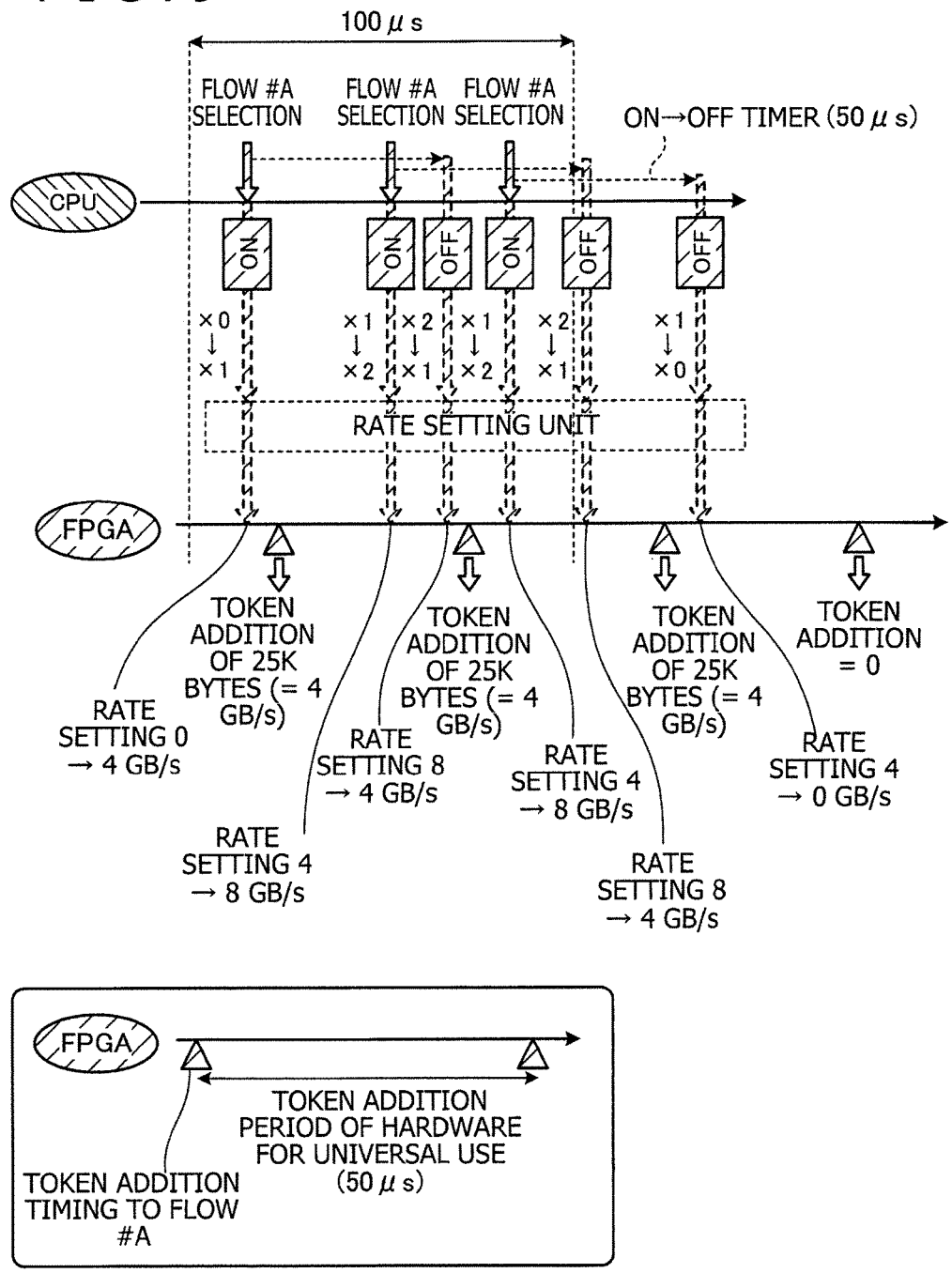
FIG. 9 is an explanatory view illustrating an example of token addition timings of a CPU and an FPGA.

FIG. 9 is an explanatory view illustrating an example of token addition timings of a CPU and an FPGA. The CPU and the FPGA may be the CPU 15A and the FPGA 13, respectively, illustrated in FIG. 6. It is assumed that the setting unit 32A of the transmission apparatus 1 of the second embodiment detects selection of the selection flow #A by three times within a section of 100 microseconds. When a selection notification (output ON) of the selection flow #A for the first time is detected, the setting unit 32A sets the setting magnification for the shaping rate (4 Gbps) of the selection flow #A to one time. Thereupon, the bandwidth controlling unit 24 adds tokens of 25 k bytes (4 Gbps) in response to arrival of an addition period to the token bucket 24B of the selection flow #A.

When a selection notification (output ON) of the selection flow #A for the second time is detected within the output ON section of the selection flow #A for the first time, the setting unit 32A increments the setting magnification for the shaping rate of the selection flow #A by +1. For example, the setting unit 32A sets the setting magnification for the shaping rate (4 Gbps) of the selection flow #A to two times, for example, to 8 Gbps. When an output OFF state of the selection flow #A for the first time is detected, the setting unit 32A decrements the setting magnification for the shaping rate of the selection flow #A by 1 and sets the shaping rate (4 Gbps) of the selection flow #A to one time. Thereupon, the bandwidth controlling unit 24 adds tokens of 25 k bytes (4 Gbps) in response to arrival of an addition period to the token bucket 24B of the selection flow #A.

Further, when a selection notification (output ON) of the selection flow #A for the third time is detected within the output ON section of the selection flow #A for the second time, the setting unit 32A increments the setting magnification for the shaping rate of the selection flow #A by +1. The setting unit 32A sets the setting magnification for the shaping rate (4 Gbps) of the selection flow #A to two times. When an output OFF state of the selection flow #A for the second time is detected, the setting unit 32A decrements the setting magnification for the selection flow #A by 1 and sets the shaping rate (4 Gbps) of the selection flow #A to one time. Thereupon, the bandwidth controlling unit 24 adds tokens of 25 k bytes (4 Gbps) in response to arrival of an addition period to the token bucket 24B of the selection flow #A.

When an output OFF state of the selection flow #A for the third time is detected, the setting unit 32A decrements the setting magnification of the selection flow #A by 1 and sets the shaping rate (4 Gbps) of the selection flow #A to zero times. As a result, the FPGA 13 is placed into a state in which, for example, packets of the selection flow #A for 75 k bytes may be read out within a section of 100 microseconds.

Figure 10:
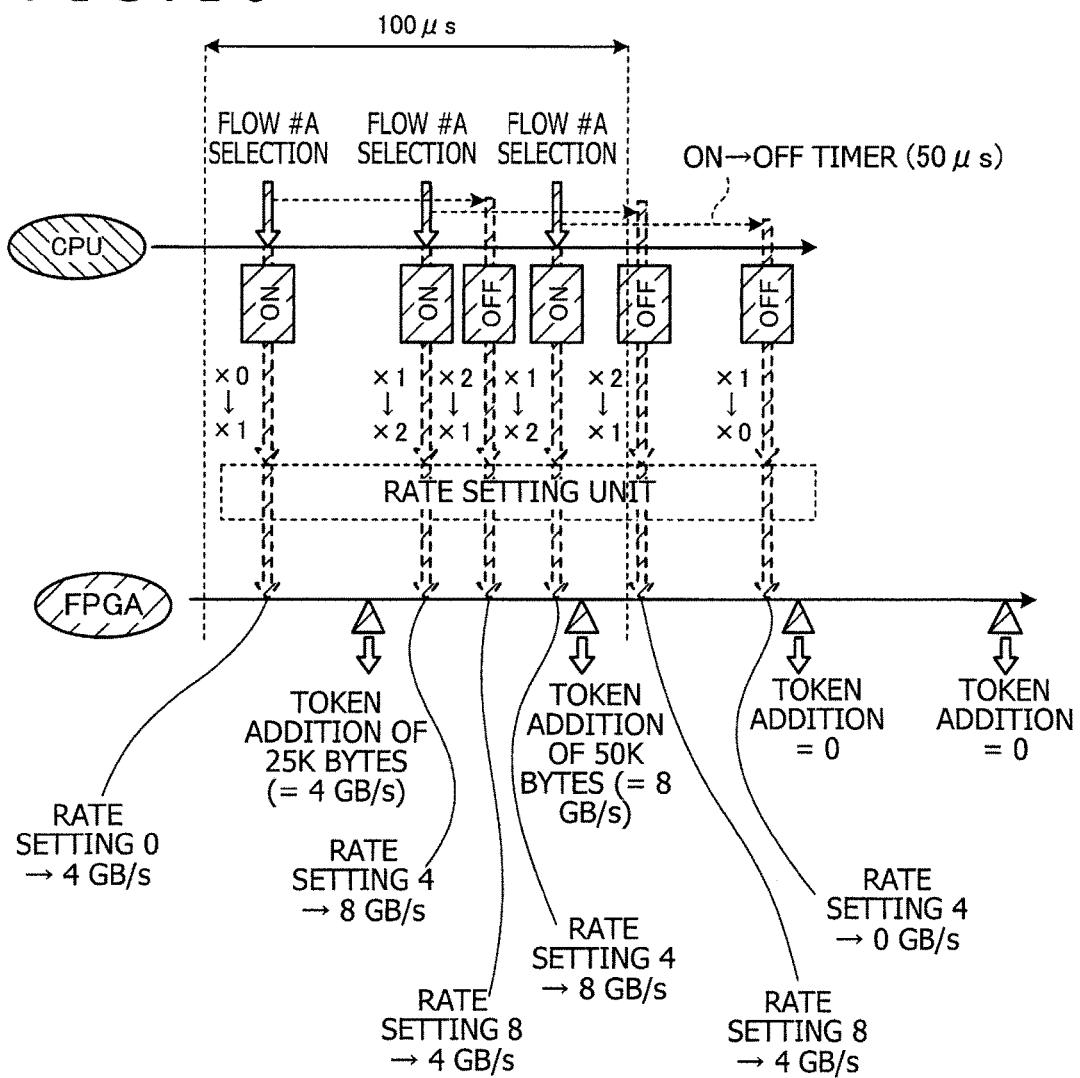
FIG. 10 is an explanatory view illustrating an example of token addition timings of a CPU and an FPGA.

FIG. 10 is an explanatory view illustrating an example of token addition timings of a CPU and an FPGA. The CPU and the FPGA may be the CPU 15A and the FPGA 13, respectively, illustrated in FIG. 6. If a selection notification (output ON) of the selection flow #A for the first time is detected, the setting unit 32A sets the setting magnification for the shaping rate (4 Gbps) of the selection flow #A to one time. Thereupon, the bandwidth controlling unit 24 adds tokens of 25 k bytes (4 Gbps) in response to arrival of an addition period to the token bucket 24B of the selection flow #A.

If a selection notification (output ON) of the selection flow #A for the second time is detected within the output ON section of the selection flow #A for the first time, the setting unit 32A increments the setting magnification for the shaping rate of the selection flow #A by +1. Then, the setting unit 32A sets the setting magnification for the shaping rate (4 Gbps) of the selection flow #A to two times. Further, if an output OFF state of the selection flow #A for the first time is detected, the setting unit 32A decrements the setting magnification for the shaping rate of the selection flow #A by 1 and sets the setting magnification for the shaping rate (4 Gbps) of the selection flow #A to one time. Further, if a selection notification (output ON) of the selection flow #A for the third time is detected within the output ON section of the selection flow #A for the second time, the setting unit 32A increments the setting magnification for the shaping rate of the selection flow #A by +1. Then, the setting unit 32A sets the setting magnification for the shaping rate (4 Gbps) of the selection flow #A to two times. Thereupon, the bandwidth controlling unit 24 adds tokens of 50 k bytes (8 Gbps) in response to arrival of an addition period to the token bucket 24B of the selection flow #A.

If an OFF state of the selection flow #A for the second time is detected, the setting unit 32A decrements the setting magnification for the shaping rate of the selection flow #A by 1 and sets the setting magnification for the shaping rate (4 Gbps) of the selection flow #A to one time. Further, if a selection notification (output OFF) of the selection flow #A for the third time is detected, the setting unit 32A decrements the setting magnification for the shaping rate of the selection flow #A by 1 and sets the setting magnification for the shaping rate (4 Gbps) of the selection flow #A to zero times. Thereupon, the bandwidth controlling unit 24 adds tokens of 0k byte (0 Gbps) in response to arrival of an addition period to the token bucket 24B of the selection flow #A. As a result, the FPGA 13 is placed into a state in which packets of the selection flow #A for 75 k bytes may be read out within a section of, for example, 100 microseconds.

Figure 11:
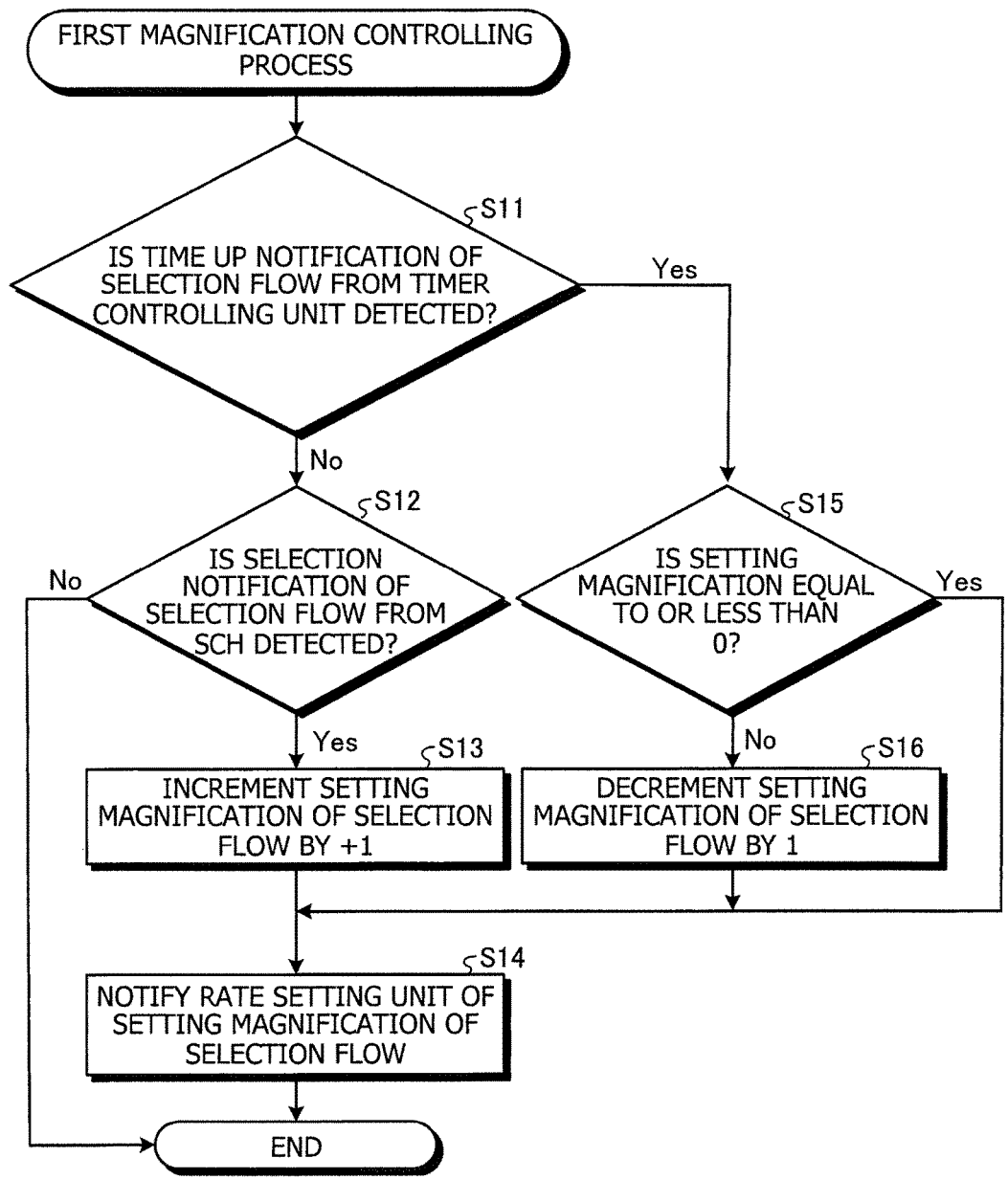
FIG. 11 is a flow chart illustrating an example of processing action of a magnification controlling unit relating to a first magnification controlling process.

Now, action of the transmission apparatus 1 of the second embodiment is described. FIG. 11 is a flow chart illustrating an example of processing action of a magnification controlling unit relating to a first magnification controlling process. The magnification controlling unit may be the magnification controlling unit 41 illustrated in FIG. 6. Referring to FIG. 11, the magnification controlling unit 41 decides whether or not a time up notification of a selection flow is detected from the timer controlling unit 43 (operation S11). If a time up notification of a selection flow is not detected (No in operation S11), the magnification controlling unit 41 decides whether or not a selection notification (output ON) of a selection flow is detected from the SCH 31 (operation S12). If a selection notification of a selection flow is detected (Yes in operation S12), the magnification controlling unit 41 increments the setting magnification for the shaping rate of the selection flow by +1 (operation S13). Then, the magnification controlling unit 41 notifies the rate setting unit 42 of the setting magnification for the selection flow (operation S14) and ends the processing action illustrated in FIG. 11.

If a selection notification of a selection flow from the SCH 31 is not detected (No in operation S12), the magnification controlling unit 41 ends the processing action illustrated in FIG. 11. If a time up notification of the selection flow is detected from the timer controlling unit 43 (Yes in operation S11), the magnification controlling unit 41 decides that the output ON section of the selection flow comes to an end and an output OFF state is entered. Then, the magnification controlling unit 41 decides whether or not the current setting magnification for the selection flow is equal to or less than zero (operation S15).

If the current setting magnification for the selection flow is not equal to or less than zero (No in operation S15), the magnification controlling unit 41 decrements the setting magnification at present by 1 (operation S16) and advances the processing to operation S14 in order to notify the rate setting unit 42 of the setting magnification for the shaping rate of the selection flow. If the setting magnification at present of the selection flow is equal to or less than zero (Yes in operation S15), the magnification controlling unit 41 advances its processing to operation S14 in order to notify the rate setting unit 42 of the setting magnification for the selection flow.

If a selection notification (output ON) of the selection flow is detected, the magnification controlling unit 41 increments the setting magnification for the shaping rate of the selection flow by +1 and notifies the rate setting unit 42 of the setting magnification. As a result, every time a selection notification (output ON) of the selection flow is detected, the magnification controlling unit 41 adds the setting magnification for the shaping rate.

If a time up notification of the selection flow is detected, the magnification controlling unit 41 decrements the setting magnification for the shaping rate of the selection flow by 1 and notifies the rate setting unit 42 of the setting magnification. As a result, every time a time up notification of the selection flow is detected, the magnification controlling unit 41 subtracts the setting magnification.

Figure 12:
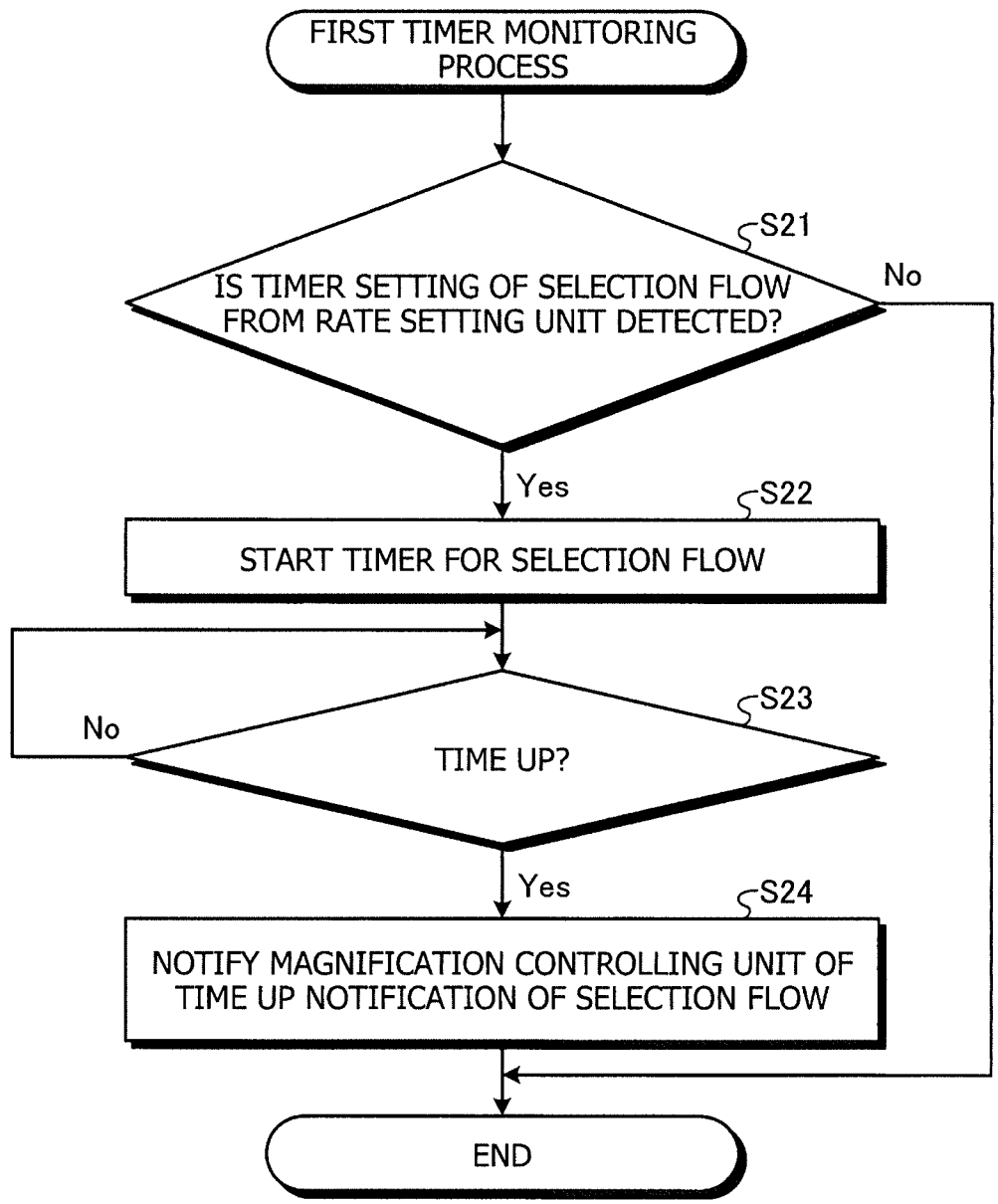
FIG. 12 is a flow chart illustrating an example of processing action of a timer controlling unit relating to a first timer monitoring process.

FIG. 12 is a flow chart illustrating an example of processing action of a timer controlling unit relating to a first timer monitoring process. The timer controlling unit may be the timer controlling unit 43 illustrated in FIG. 6. Referring to FIG. 12, the timer controlling unit 43 decides whether or not a timer setting of a selection flow is detected from the rate setting unit 42 (operation S21). If a timer setting of a selection flow is detected (Yes in operation S21), the timer controlling unit 43 activates an ON section timer for the selection flow (operation S22). The timer controlling unit 43 decides whether or not the ON section timer for the selection flow times out (operation S23). If the ON section timer for the selection flow times out (Yes in operation S23), the timer controlling unit 43 notifies the magnification controlling unit 41 of a time up notification of the selection flow (operation S24) and ends the processing action illustrated in FIG. 12.

If a setting notification of a selection flow is not detected from the rate setting unit 42 (No in operation S21), the timer controlling unit 43 ends the processing action illustrated in FIG. 12. If the ON section time for the selection flow does not time out (No in operation S23), the timer controlling unit 43 decides that the output ON section of the selection flow is continuing and advances its processing to operation S23 in order to decide whether or not the ON section timer times out.

If a setting notification of a selection flow is detected, the timer controlling unit 43 activates the ON section timer, and when the ON section timer times out, the timer controlling unit 43 notifies the magnification controlling unit 41 of a time up notification of the selection flow. As a result, the magnification controlling unit 41 may recognize the OFF state of the output ON section of the selection flow.

Figure 13:
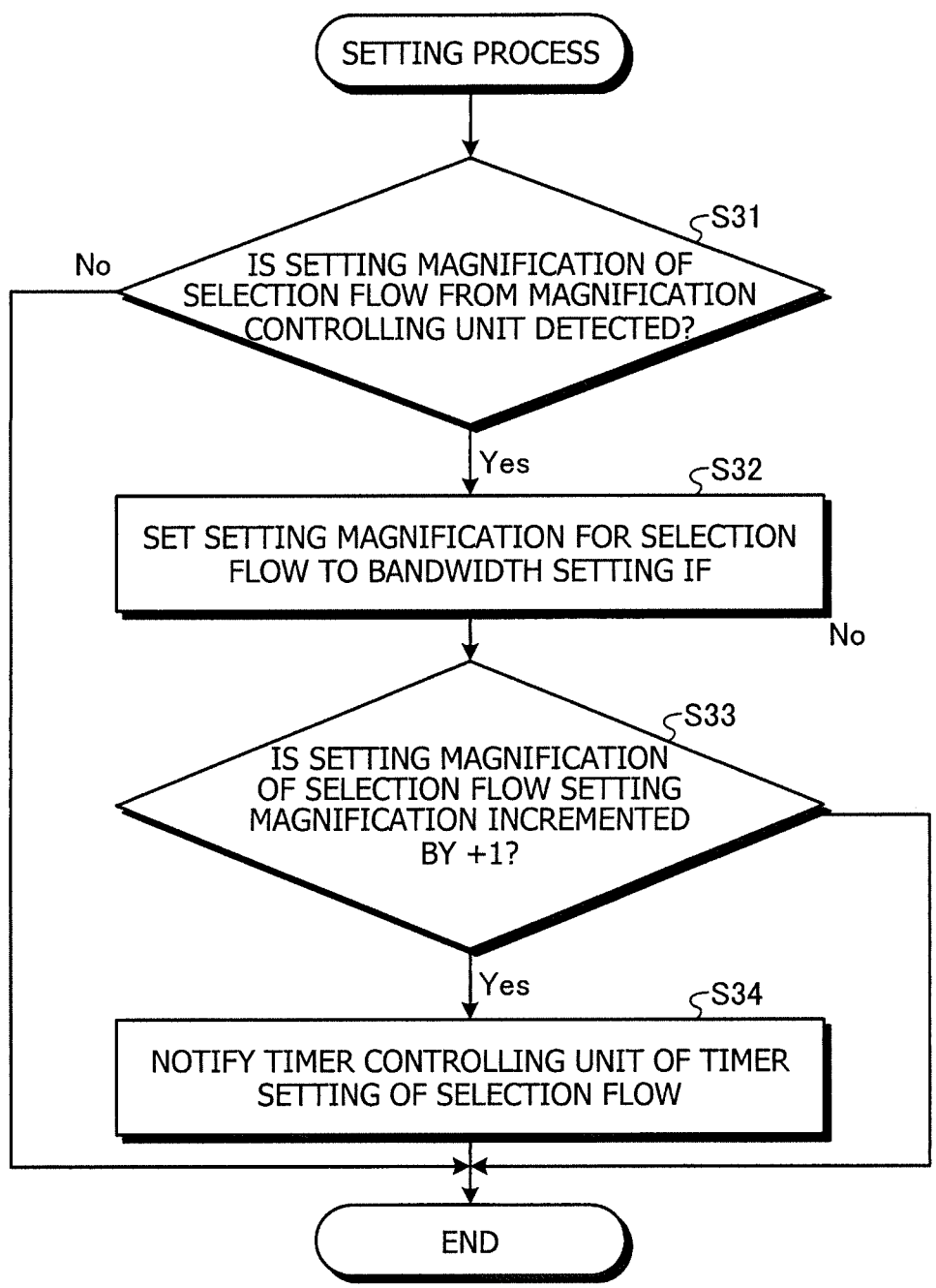
FIG. 13 is a flow chart illustrating an example of processing action of a rate setting unit relating to a setting process.

FIG. 13 is a flow chart illustrating an example of processing action of a rate setting unit relating to a setting process. The rate setting unit may be the rate setting unit 42 illustrated in FIG. 6. Referring to FIG. 13, the rate setting unit 42 decides whether or not a setting magnification for a selection flow is detected from the magnification controlling unit 41 (operation S31). If a setting magnification for the selection flow is detected (Yes in operation S31), the rate setting unit 42 sets the setting magnification for the selection flow to the bandwidth setting IF 27 (operation S32). As a result, the bandwidth setting IF 27 sets the output ON section, an amount of set rate and setting magnification for the shaping rate of the shaper 24A corresponding to the output queue 23A of the selection flow.

The rate setting unit 42 decides whether or not the setting magnification for the shaping rate of the selection flow is a setting magnification for incrementing by +1 (operation S33). If the setting magnification for the shaping rate of the selection flow is a setting magnification for incrementing by +1 (Yes in operation S33), the rate setting unit 42 notifies the timer controlling unit 43 of a timer setting of the selection flow (operation S34) and ends the processing action illustrated in FIG. 13.

If a setting magnification for the selection flow is not detected (No in operation S31), the rate setting unit 42 ends the processing action illustrated in FIG. 13. If the setting magnification for the selection flow is not a setting magnification for increment by +1 (No in operation S33), the rate setting unit 42 ends the processing action illustrated in FIG. 13.

If a setting magnification for the selection flow is detected, the rate setting unit 42 sets the setting magnification, output ON section and amount of set rate of the selection flow to the shaper 24A for the selection flow. As a result, the bandwidth controlling unit 24 may control outputting of the selection flow based on the setting magnification for the selection flow.

If the setting magnification for the selection flow is a setting magnification for incrementing by +1, the rate setting unit 42 notifies the timer controlling unit 43 of the timer setting. As a result, the timer controlling unit 43 may monitor the output ON section of the selection flow.

Figure 14:
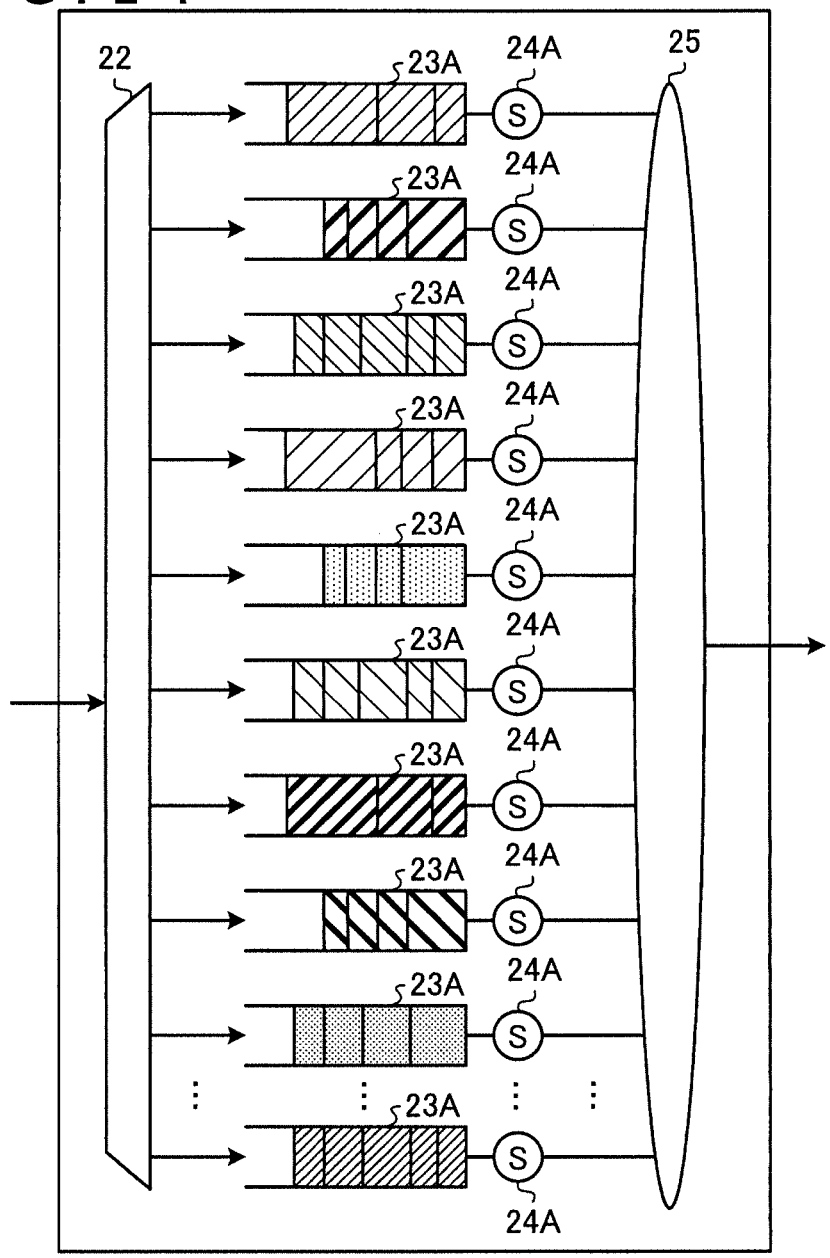
FIG. 14 is an explanatory view illustrating an example of priority class control in an FPGA.

FIG. 14 is an explanatory view illustrating an example of priority class control in an FPGA. The FPGA may be the FPGA 13 illustrated in FIG. 13. In the priority class control, an output of a selection flow from the plurality of output queues 23A is controlled based on a class of the communication quality (QoS) for each flow ID. Each shaper 24A in the bandwidth controlling unit 24 in the FPGA 13 adjusts an output of a selection flow based on a setting magnification for a shaping rate, an output ON section and an amount of set rate of the shaper 24A for each selection flow from the SCH 31. For example, if all of 100 flows are accommodated into a same class and the shapers 24A of the individual output queues 23A are time-divisionally ON/OFF controlled in a flow selection order by the SCH 31, priority class control may be implemented for the first to 100th classes. As a result, even if there are hardware constraints, it is possible to flexibly cope with a variation of a priority class by the SCH 31. For example, even if the hardware configuration of the FPGA 13 in which a shaper 24A is disposed for each of the output queues 23A is not changed, the FPGA 13 may implement priority control flexibly coping with a change of a priority class from the SCH 31 within the range of the number of the shapers 24A.

Since the transmission apparatus 1 of the second embodiment fixes an output ON section for each selection flow and sets the output ON section to a multiple of an addition period, it is possible to suppress conflict in setting timing of selection flows and displacement in token addition timing.

While the transmission apparatus 1 may suppress occurrence of setting conflict of the SCH 31, it may implement priority control of an arbitrary rank number from the SCH 31 by adjustment of the amount of set rate, an output ON section and a setting magnification in the shaping rate independent of the token addition timing of the shaper 24A.

It is to be noted that, when the setting unit 32A in the second embodiment described hereinabove detects a selection notification of a selection flow from the SCH 31, it sequentially changes the setting magnification for the shaping rate of the selection flow. However, the process for sequentially changing the setting magnification every time a selection notification is detected puts a burden on the setting unit 32A. Therefore, an embodiment for coping with this situation is described as the third embodiment below.

Third Embodiment

Figure 15:
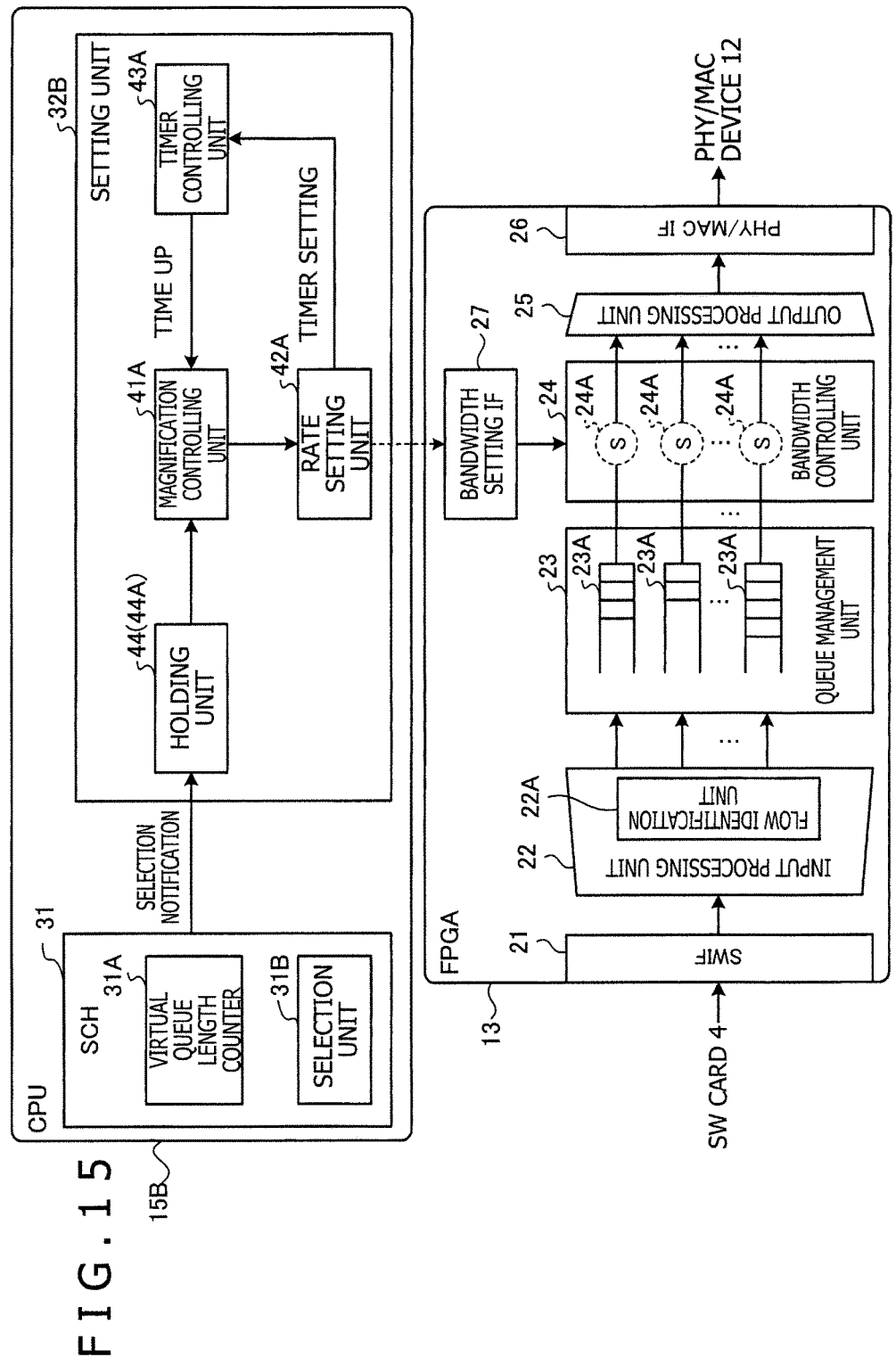
FIG. 15 is an explanatory view depicting an example of an FPGA and a CPU in an IF card of a third embodiment.

FIG. 15 is an explanatory view depicting an example of an FPGA and a CPU in an IF card in the third embodiment. It is to be noted that same elements to those of the transmission apparatus 1 of the second embodiment are denoted by same reference symbols and overlapping description of the configuration and action of them is omitted herein.

A setting unit 32B includes a holding unit 44 in addition to a magnification controlling unit 41A, a rate setting unit 42A and a timer controlling unit 43A. The holding unit 44 counts the number of times of a selection notification (output ON) for each selection flow from the SCH 31 for a given period of time and notifies the magnification controlling unit 41A in bulk of the number of selected times of the individual selection flows after lapse of the given period of time.

The magnification controlling unit 41A increments the setting magnification for the shaping rate of the selection flow in response to the number of selected times for each selection flow. For example, if the number of selected times is three, the magnification controlling unit 41A sets the setting magnification for the shaping rate of the selection flow to three times. Then, the magnification controlling unit 41A notifies the rate setting unit 42A of the setting magnification for the selection flow.

The rate setting unit 42A sets the setting magnification for the shaping rate of the selection flow to the bandwidth setting IF 27 and then notifies the timer controlling unit 43A of the timer setting. When the timer setting is detected, the timer controlling unit 43A activates an ON section timer for the selection flow. If the ON section timer for the selection flow times out, the timer controlling unit 43A notifies the magnification controlling unit 41A of a time up notification of the selection flow. When the time up notification of the selection flow is detected, the magnification controlling unit 41A decrements the setting magnification for the shaping rate of the selection flow by a number equal to the number of selected times. For example, if the setting magnification is three times and the number of selected times is three, the magnification controlling unit 41A decrements three times of the setting magnification by 3 and sets the setting magnification to zero times. The magnification controlling unit 41A notifies the rate setting unit 42A of the setting magnification after decremented.

Figure 16:
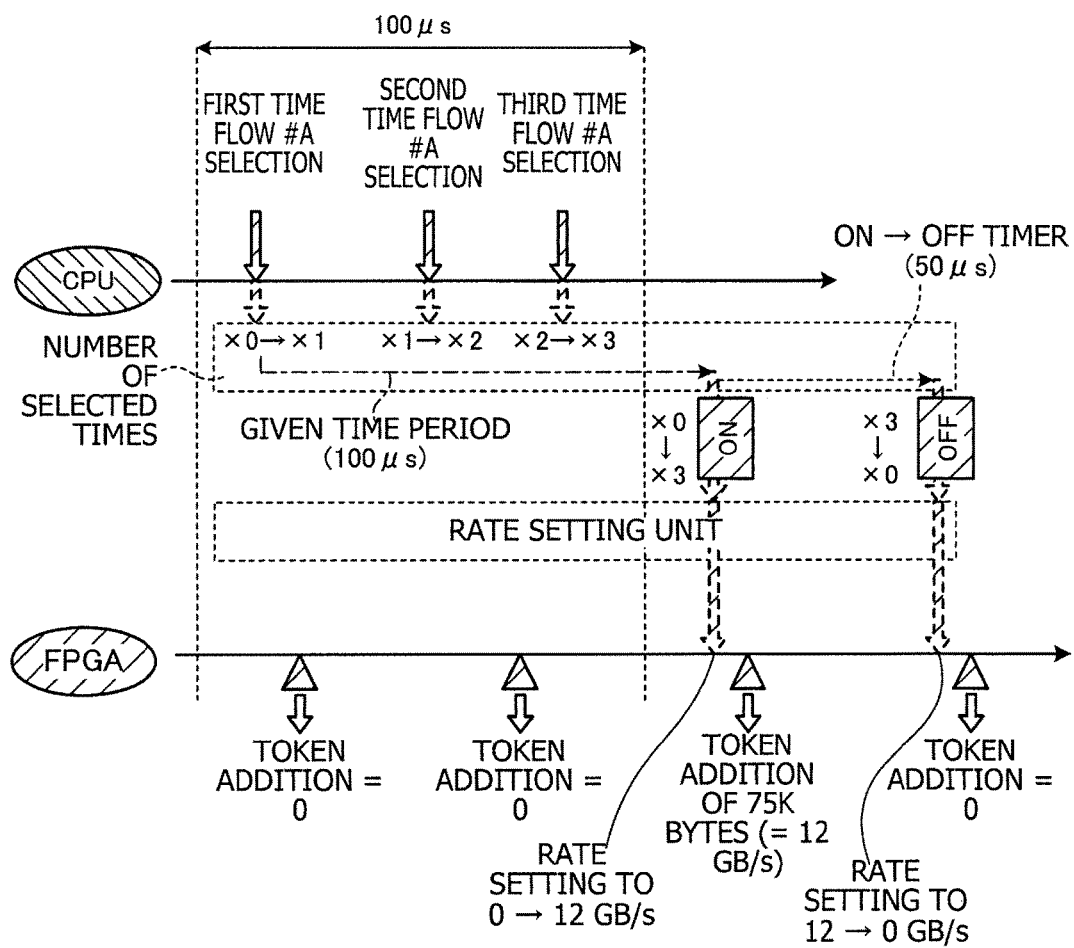
FIG. 16 is an explanatory view illustrating an example of token addition timings of a CPU and an FPGA.

FIG. 16 is an explanatory view illustrating an example of token addition timings of a CPU and an FPGA. The CPU and the FPGA may be the CPU 15B and the FPGA 13 illustrated in FIG. 15. Note that it is assumed that the given period of time of the holding unit 44 is 100 microseconds and the output ON section of the shaping rate is 50 microseconds. The holding unit 44 activates a given time timer and increments, when it detects a selection notification (output ON) of the selection flow #A for the first time from the SCH 31, the number of selected times of the selection flow #A by +1. Further, if the holding unit 44 detects a selection notification (output ON) of the selection flow #A for the second time from the SCH 31, it increments the number of selected times for the selection flow #A by +1 and sets the number of selected times to two times. Further, if the holding unit 44 detects a selection notification of the selection flow #A for the third time from the SCH 31, it increments the number of selected times of the selection flow #A by +1 and sets the number of selected times to three times. If the given time timer times out, the holding unit 44 notifies the magnification controlling unit 41A, for example, of the number of selected times of the selection flow #A. Since the number of selected times of the selection flow #A is three, the magnification controlling unit 41A sets the setting magnification for the shaping rate of the selection flow #A to three times according to the number of selected times. As a result, the shaping rate of the selection flow #A becomes 4 Gbps×3=12 Gbps.

Further, after the setting magnification for the shaping rate of the selection flow #A is set, the timer controlling unit 43A activates an ON section timer and notifies, when the ON section time times out, the magnification controlling unit 41A of a time up notification. The magnification controlling unit 41A decrements the setting magnification by an amount corresponding to the number of selected times in response to the time up notification and therefore sets the setting magnification to zero times.

It is to be noted that, although an addition period comes after a selection notification (output ON) of the selection flow #A for the first time is detected, the addition token amount is zero, and although an addition period comes after a selection notification (output ON) of the selection flow #A for the second time is detected, also the addition token amount is zero. However, if an addition period comes after the shaping rate is set to three times in response to a notification of the number of selected times from the holding unit 44, the addition token amount becomes 75 k bytes. For example, the addition token amount becomes 75 k bytes within the section of 100 microseconds.

Figure 17:
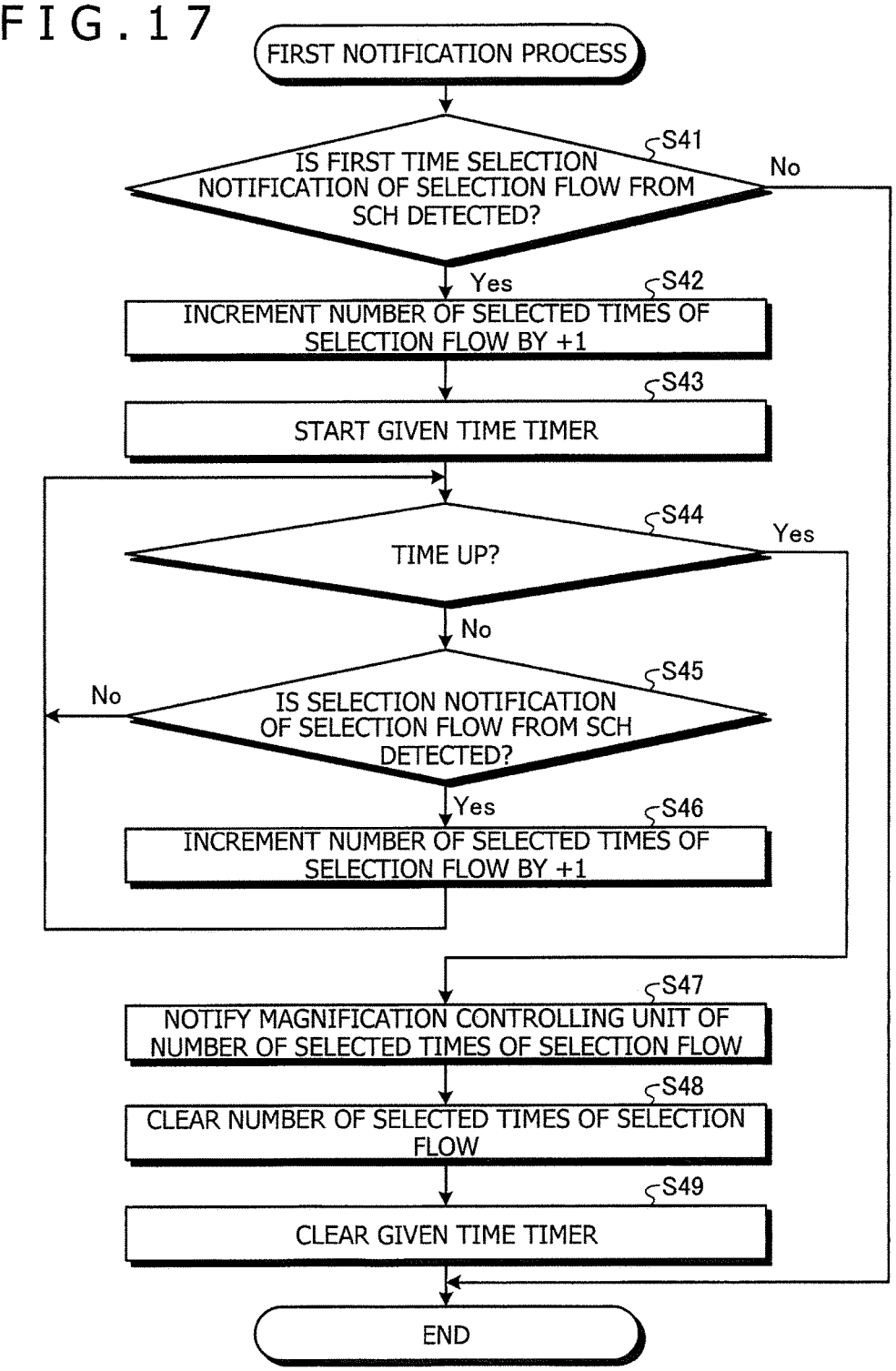
FIG. 17 is a flow chart illustrating an example of processing action of a holding unit relating to a first notification process.

Now, action of the transmission apparatus 1 of the third embodiment is described. FIG. 17 is a flow chart illustrating an example of processing action of a holding unit relating to a first notification process. The holding unit may be the holding unit 44 illustrated in 15. Referring to FIG. 17, the holding unit 44 decides whether or not it detects a selection notification (output ON) of the selection flow for the first time from the SCH 31 (operation S41). If a selection notification (output ON) of the selection flow for the first time is detected (Yes in operation S41), the holding unit 44 increments the number of selected times of the selection flow by +1 (operation S42) and activates the given time timer (operation S43).

The holding unit 44 decides whether or not the given time timer times out (operation S44). If the given time timer does not time out (No in operation S44), the holding unit 44 decides whether or not a selection notification (output ON) of the selection flow from the SCH 31 is detected (operation S45).

If a selection notification (output ON) of the selection flow is detected (Yes in operation S45), the holding unit 44 increments the number of selected times of the selection flow by +1 (operation S46) and advances the processing to operation S44 in order to decide whether or not the given time timer times out. If a selection notification (output ON) of the selection flow is not detected (No in operation S45), the holding unit 44 advances its processing to operation S44 in order to decide whether or not the given time timer times out.

If the given time timer times out (Yes in operation S44), the holding unit 44 notifies the magnification controlling unit 41A of the number of selected times of the selection flow (operation S47). The holding unit 44 clears the number of selected times of the selection flow (operation S48) and clears the given time timer (operation S49), thereby ending the processing action illustrated in FIG. 17. If a selection notification (output ON) of the selection flow for the first time from the SCH 31 is not detected (No in operation S41), the holding unit 44 ends the processing action illustrated in FIG. 17.

The holding unit 44 notifies the magnification controlling unit 41A of the number of selected times for the given period of time of the selection flow in bulk. The magnification controlling unit 41A sets a setting magnification for the shaping rate of the selection flow in response to the number of selected times of the selection flow. As a result, the magnification controlling unit 41A may reduce the calculation burden of the setting magnification for each selection notification.

If a time up notification of the selection flow, for example, an output OFF state, is detected, the magnification controlling unit 41A decrements the setting magnification for the selection flow by the number of selected times and sets the setting magnification for the shaping rate of the selection flow. As a result, the magnification controlling unit 41A may reduce the calculation burden of the setting magnification for each output OFF state.

Figure 18:
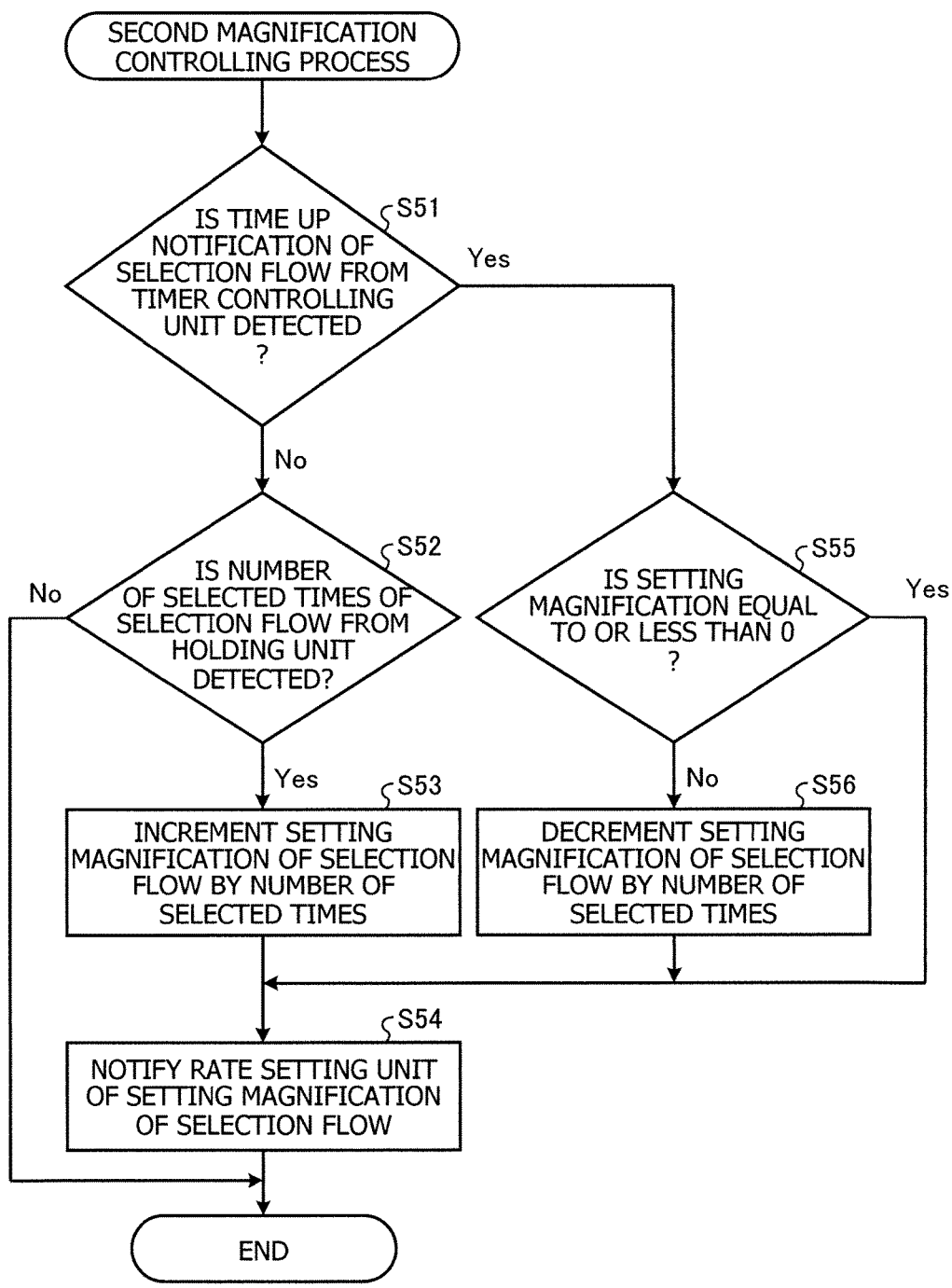
FIG. 18 is a flow chart illustrating an example of processing action of a magnification controlling unit relating to a second magnification controlling process.

FIG. 18 is a flow chart illustrating an example of processing action of a magnification controlling unit relating to a second magnification controlling process. The magnification controlling unit may be the magnification controlling unit 41A illustrated in FIG. 15. Referring to FIG. 18, the magnification controlling unit 41A decides whether or not a time up notification of the selection flow is detected from the timer controlling unit 43A (operation S51). If a time up notification of the selection flow is not detected (No in operation S51), the magnification controlling unit 41A decides whether or not the number of selected times of the selection flow is detected from the holding unit 44 (operation S52).

If the number of selected times of the selection flow is detected (Yes in operation S52), the magnification controlling unit 41A increments the setting magnification for the shaping rate of the selection flow by a number equal to the number of selected times (operation S53). The magnification controlling unit 41A notifies the rate setting unit 42A of the setting magnification for the selection flow (operation S54) and ends the processing action illustrated in FIG. 18.

If the number of selected times of the selection flow is not detected (No in operation S52), the magnification controlling unit 41A ends the processing action illustrated in FIG. 18. If a time up notification of the selection flow is detected from the timer controlling unit 43A (Yes in operation S51), the magnification controlling unit 41A decides whether or not the current setting magnification for the selection flow is equal to or less than zero (operation S55). If the current setting magnification for the selection flow is not equal to or less than zero (No in operation S55), the magnification controlling unit 41A decrements the setting magnification for the shaping rate of the selection flow by an amount equal to the number of selected times (operation S56). The magnification controlling unit 41A advances its processing to operation S54 in order to notify the rate setting unit 42A of the setting magnification for the selection flow. If the current setting magnification for the selection flow is equal to or less than zero (Yes in operation S55), the magnification controlling unit 41A advances its processing to operation S54 in order to notify the rate setting unit 42A of the setting magnification for the selection flow.

The magnification controlling unit 41A increments, when it detects the number of selected times of the selection flow from the holding unit 44, the setting magnification for the selection flow by a number equal to the number of selected times and notifies the rate setting unit 42A of the setting magnification. As a result, the rate setting unit 42A may set the setting magnifications for the shaping rate corresponding to the number of selected times in bulk to the shapers 24A.

The magnification controlling unit 41A decrements, when it detects a time up notification of the selection flow, the setting magnification for the selection flow the number of selected times and notifies the rate setting unit 42A of the setting magnifications. As a result, the rate setting unit 42A may set the setting magnifications for the shaping rate in bulk.

In the transmission apparatus 1 of the third embodiment, the holding unit 44 notifies the magnification controlling unit 41A of the number of selected times of the selection flow for the given period of time in bulk. The magnification controlling unit 41A sets a setting magnification for the shaping rate of the selection flow in response to the number of selected times of the selection flow. As a result, the magnification controlling unit 41A may reduce the calculation burden of the setting magnification for every selection notification.

When the magnification controlling unit 41A detects a time up notification of a selection flow, for example, a output OFF state, it decrements the setting magnification for the selection flow by the number of selected times and sets a setting magnification for the shaping rate of the selection flow. As a result, the magnification controlling unit 41A may reduce the calculation burden of the setting magnification for each output OFF event.

It is to be noted that, although the holding unit 44 notifies, when the given time timer times out, the magnification controlling unit 41A of the number of selected times of the selection flow, the notification of the number of selected times is not limited to this and may be changed suitably. Accordingly, an embodiment of this is described below as the fourth embodiment. It is to be noted that same elements to those of the transmission apparatus 1 of the third embodiment are denoted by same reference symbols and overlapping description of the configuration and action of them is omitted herein.

Fourth Embodiment

A holding unit 44A in the fourth embodiment is different from the holding unit 44 in the third embodiment in that, when the number of selected times of a selection flow exceeds the given number of times, the number of selected times of the selection flow is notified to the magnification controlling unit 41A without waiting for the time up of the given time timer.

Figure 19:
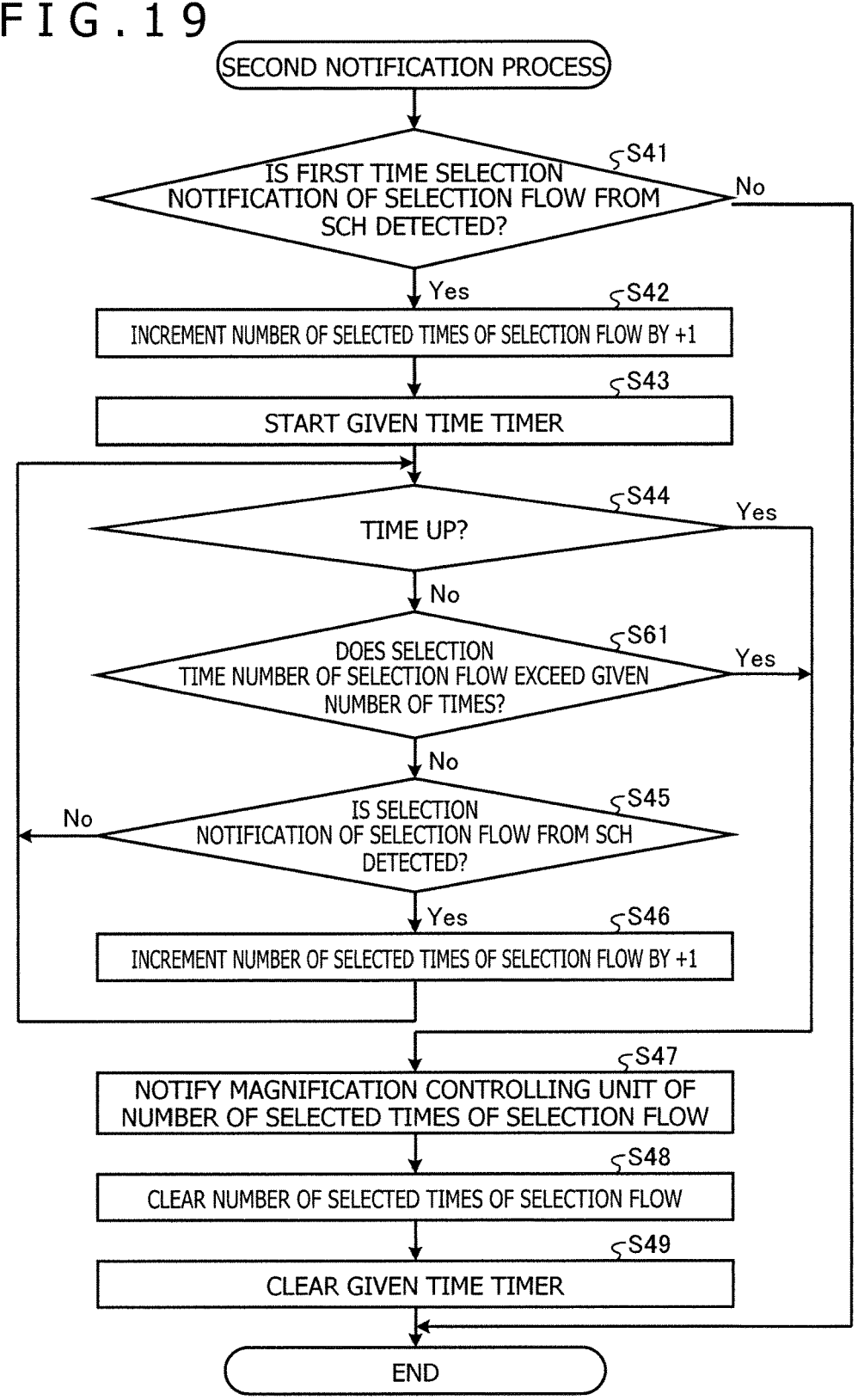
FIG. 19 is a flow chart illustrating an example of processing action of a holding unit relating to a second notification process.

Now, action of the transmission apparatus 1 of the fourth embodiment is described. FIG. 19 is a flow chart illustrating an example of processing action of the holding unit 44A relating to the second notification process. If the given time timer does not time out in operation S44 (No in operation S44), the holding unit 44A decides whether or not the number of selected times of the selection flow exceeds the given number of times (operation S61). If the number of selected times of the selection flow exceeds the given number of times (Yes in operation S61), the holding unit 44A advances the processing to operation S47 in order to notify the magnification controlling unit 41A of the number of selected times of the selection flow. If the number of selected times of the selection flow does not exceed the given number of times (No in operation S61), the holding unit 44A advances the processing to operation S45 in order to determine whether or not a selection notification of the selection flow is detected from the SCH 31.

If the number of selected times of the selection flow exceeds the given number of times, the holding unit 44A notifies the magnification controlling unit 41A of the number of selected times in bulk. The magnification controlling unit 41A sets a setting magnification for the shaping rate of the selection flow in response to the number of selected times of the selection flow. As a result, the magnification controlling unit 41A may reflect the magnification setting of the shaping rate readily while decreasing the calculation burden of the setting magnification.

If a time up notification of the selection flow is detected, the magnification controlling unit 41A decrements the setting magnification for the selection flow by the number of selected times and sets a setting magnification for the shaping rate of the selection flow. As a result, the magnification controlling unit 41A may reduce the calculation burden of the setting magnification.

In the transmission apparatus 1 of the fourth embodiment, when the number of selected times of the selection flow exceeds the given number of times, the holding unit 44A notifies the magnification controlling unit 41A of the number of selected times in bulk. The magnification controlling unit 41A sets a setting magnification for the shaping rate of the selection flow in response to the number of selected times of the selection flow. As a result, the magnification controlling unit 41A may reflect the magnification setting of the shaping rate readily while decreasing the calculation burden of the setting magnification.

The magnification controlling unit 41A decrements the setting magnification for the selection flow by the number of selected times when it detects a time up notification of the selection flow and sets a setting magnification for the shaping rate of the selection flow. As a result, the magnification controlling unit 41A may reduce the calculation burden of the setting magnification.

It is to be noted that, in the transmission apparatus 1 of the second to fourth embodiments, the setting magnification for the shaping rate is changed in response to the number of selected times for each selection flow. For example, although the output ON section of the shaping rate is fixed and the addition amount of tokens may be controlled theoretically, in an actual apparatus, this is sometimes influenced by disturbance. For example, when the bandwidth controlling unit 24 in the FPGA 13 is controlled from the SCH 31, since a control line shared together with a different device such as a peripheral component interconnect (PCI) bus is used, conflict with a different control packet may occur on the control line, resulting in fluctuation of the control time. For example, even where the SCH 31 outputs an ON/OFF command at intervals of 50 microseconds to the FPGA 13, delay of an OFF command may occur due to conflict on the control line, and the ON section may become 51 microseconds on the FPGA 13. In this case, depending upon a timing, originally an amount of set rate for one operation cycle becomes an amount of set rate for two operation cycles and a rate error occurs. In order to moderate such a rate error as just described, a method of expanding the output ON section of the shaping rate while the total amount of set rate is kept equal may seem applicable. An output pattern of a shaping rate in which, for example, the amount of set rate is decreased to 1/100 and the output ON section is increased to 100 times may be set, and an embodiment in this case is described below as the fifth embodiment.

Fifth Embodiment

Figure 20:
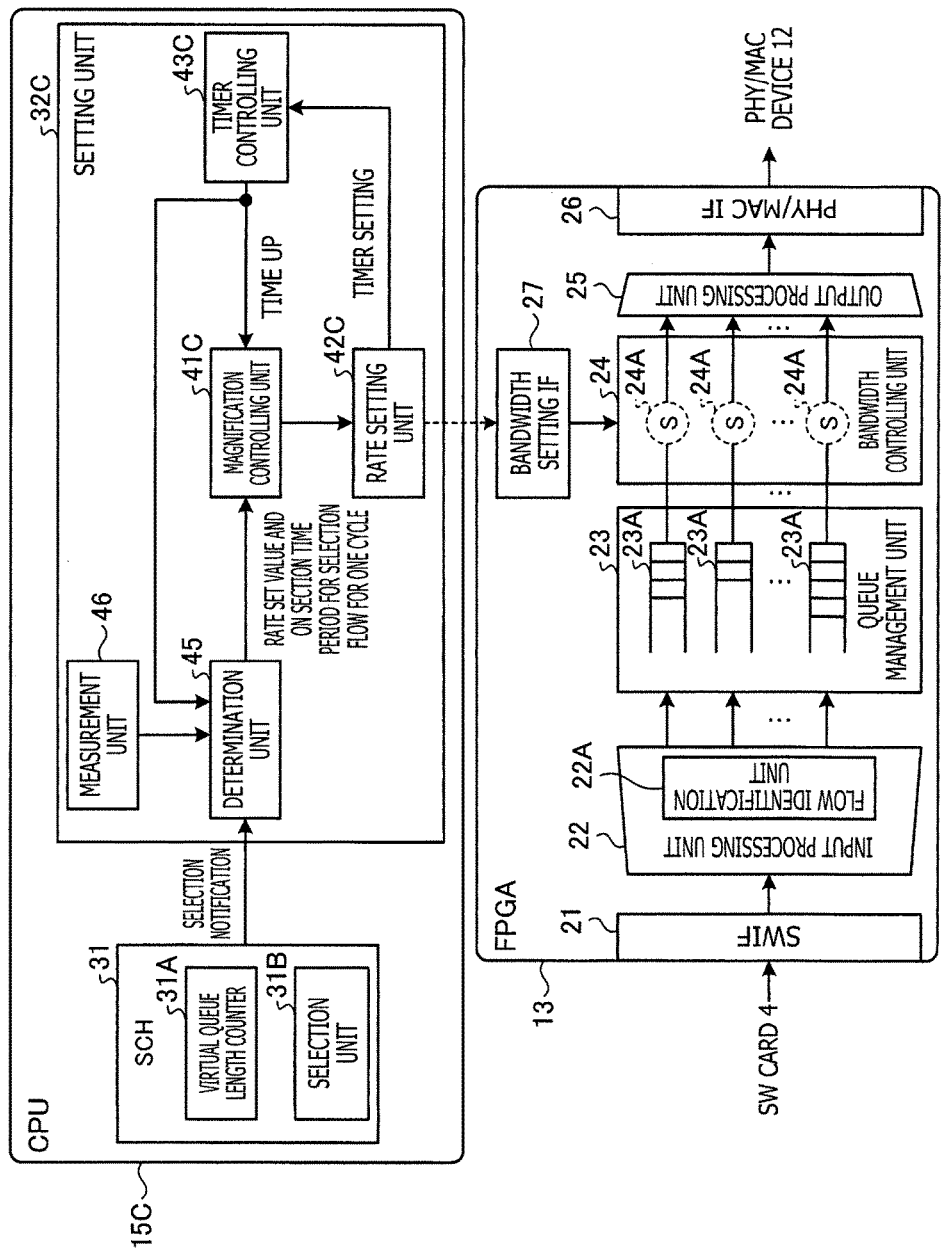
FIG. 20 is an explanatory view illustrating an example of an FPGA and a CPU in an IF card of a fifth embodiment.

FIG. 20 is an explanatory view illustrating an example of an FPGA and a CPU in an IF card of the fifth embodiment. It is to be noted that same elements to those of the transmission apparatus 1 of the second embodiment are denoted by same reference symbols and overlapping description of the configuration and action of them is omitted herein. A setting unit 32C in a CPU 15C includes a determination unit 45 and a measurement unit 46 in addition to a magnification controlling unit 41C, a rate setting unit 42C and a timer controlling unit 43C. The determination unit 45 determines an output pattern in which the total amount of set rate of the shaping rate is equal and the amount of set rate and the output ON section are changed in response to the traffic amount for each selection flow. The measurement unit 46 measures the traffic amount for each selection flow.

Figure 21:
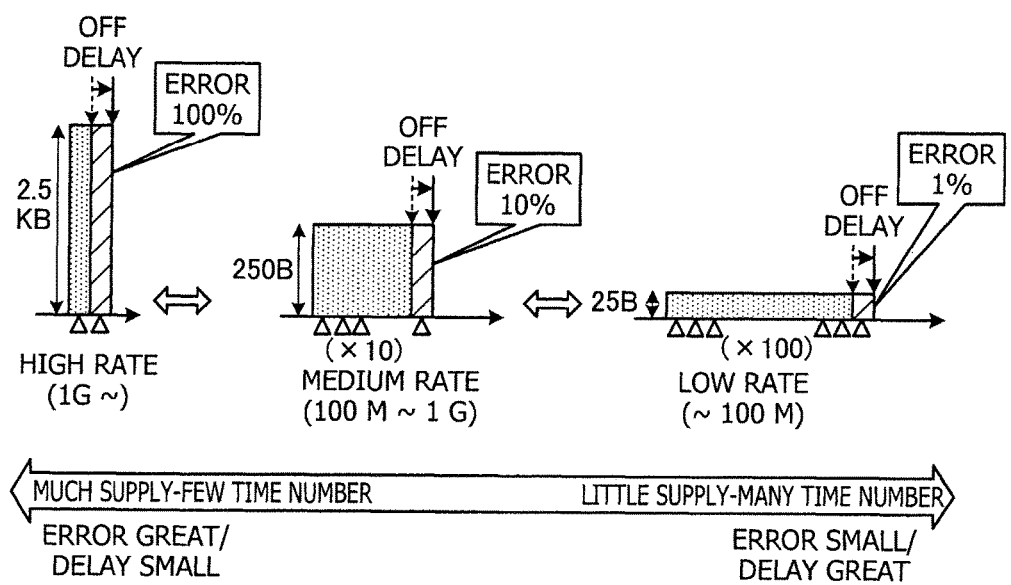
FIG. 21 is an explanatory view depicting an example of each output pattern of a shaping rate used in the fifth embodiment.

FIG. 21 is an explanatory view depicting an example of each output pattern of a shaping rate used in the fifth embodiment. Where the traffic amount of a selection flow is a high rate, the output pattern of the shaping rate is such that the amount of set rate is 2.5 k bytes and the output ON section appears one time (0.01 milliseconds). It is to be noted that, in the case of an output pattern of the high rate, since the output ON section appears one time (0.01 milliseconds), if a delay for one operation cycle occurs, the rate error is 100%. However, since the output pattern of the high rate usually indicates a high arrival frequency of packets, it is suitable for a pattern in which the supply amount in one operation cycle with which reduction of the output delay is possible is great and the number of divided times is small.

Where the traffic amount of the selection flow is a medium rate, the output pattern is such that the amount of set rate is 250 bytes and the output ON section appears ten times (0.1 milliseconds). It is to be noted that, in the case of the output pattern of the medium rate, since the output ON section appears 10 times (0.1 milliseconds), even if delay for one operation cycle occurs, the rate error keeps at 10%.

Where the traffic amount of the selection flow is a low rate, the output pattern is such that the amount of set rate is 25 bytes and the output ON section appears 100 times (1 millisecond). It is to be noted that, in the case of the output pattern of the low rate, since the output ON section appears 100 times (1 millisecond), even if a delay for one operation cycle occurs, the rate error keeps at 1%. The output pattern of the low rate is usually low in arrival frequency of packets and small in supply amount in one operation cycle with which reduction of an output delay may be performed and is suitable for a pattern that is great in the number of divided times. The output pattern of the high rate indicates a great rate error although the transmission time period is short. In contrast, the output pattern of the low rate indicates a small rate error although the transmission time period is long.

Figure 22A:
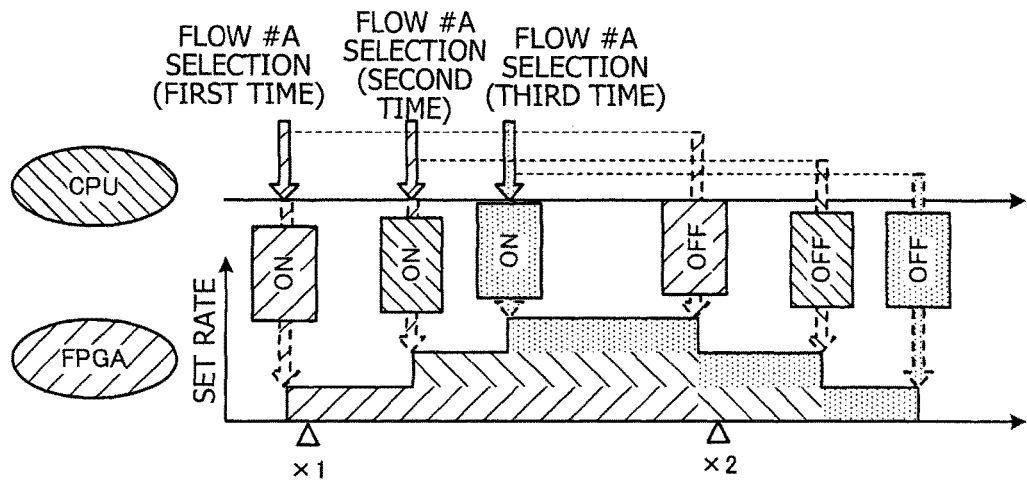
FIG. 22A is an explanatory view illustrating an example of overlapping action of token addition timings of a CPU and an FPGA.

FIG. 22A is an explanatory view illustrating an example of overlapping action of token addition timings of a CPU and an FPGA. The CPU and the FPGA may be the CPU 15C and the FPGA 13 illustrated in FIG. 20. It is assumed that the determination unit 45 determines that the traffic amount of the selection flow #A is a high rate and adopts the output pattern of the high rate. The determination unit 45 notifies the magnification controlling unit 41C of the adopted output pattern of the high rate. If a selection notification (output ON) of the selection flow #A for the first time is detected from the SCH 31, the magnification controlling unit 41C increments the setting magnification for the shaping rate by +1 and notifies the rate setting unit 42C of the setting magnification (one time) and the output pattern of the high rate. The rate setting unit 42C sets the output pattern of the high rate and the setting magnification (one time) to the bandwidth controlling unit 24 in the FPGA 13 and notifies the timer controlling unit 43C of the timer setting of the selection flow #A for the first time. Thereupon, the bandwidth controlling unit 24 adds tokens of one time in response to arrival of an addition period to the token bucket 24B of the selection flow #A.

If a selection notification (output ON) of the selection flow #A for the second time is detected within the output ON section of the selection flow #A for the first time, the magnification controlling unit 41C increments the setting magnification for the shaping rate by +1. The magnification controlling unit 41C notifies the rate setting unit 42C of the setting magnification (two times) and the output pattern of the high rate. The rate setting unit 42C sets the output pattern of the high rate and the setting magnification (two times) to the bandwidth controlling unit 24 in the FPGA 13 and notifies the timer controlling unit 43C of the timer setting of the selection flow #A for the second time.

Further, if a selection notification (output ON) of the selection flow #A for the third time is detected within the output ON sections of the selection flow #A for the first and second times, the magnification controlling unit 41C increments the setting magnification for the shaping rate by +1. The magnification controlling unit 41C notifies the rate setting unit 42C of the setting magnification (three times) and the output pattern of the high rate. The rate setting unit 42C sets the output pattern of the high rate and the setting magnification (three times) to the bandwidth controlling unit 24 in the FPGA 13 and notifies the timer controlling unit 43C of the timer setting of the selection flow #A for the third time.

If a time up notification of the selection flow #A for the first time is detected from the timer controlling unit 43C, the magnification controlling unit 41C decrements the setting magnification for the shaping rate by 1 and notifies the rate setting unit 42C of the setting magnification (two times) and the output pattern of the high rate. The rate setting unit 42C sets the output pattern of the high rate and the setting magnification (two times) to the bandwidth controlling unit 24 in the FPGA 13. Thereupon, the bandwidth controlling unit 24 adds tokens of two times in response to arrival of an addition period to the token bucket 24B of the selection flow #A.

If a time up notification of the selection flow #A for the second time is detected from the timer controlling unit 43C, the magnification controlling unit 41C decrements the setting magnification for the shaping rate by 1 and notifies the rate setting unit 42C of the setting magnification (one time) and the output pattern of the high rate. The rate setting unit 42C sets the output pattern of the high rate and the setting magnification (one time) to the bandwidth controlling unit 24 in the FPGA 13. If a time up notification of the selection flow #A for the third time is detected from the timer controlling unit 43C, the magnification controlling unit 41C decrements the setting magnification for the shaping rate by 1 and notifies the rate setting unit 42C of the setting magnification (zero times) and the output pattern of the high rate. The rate setting unit 42C sets the output pattern of the high rate and the setting magnification (zero times) to the bandwidth controlling unit 24 in the FPGA 13.

Figure 22B:
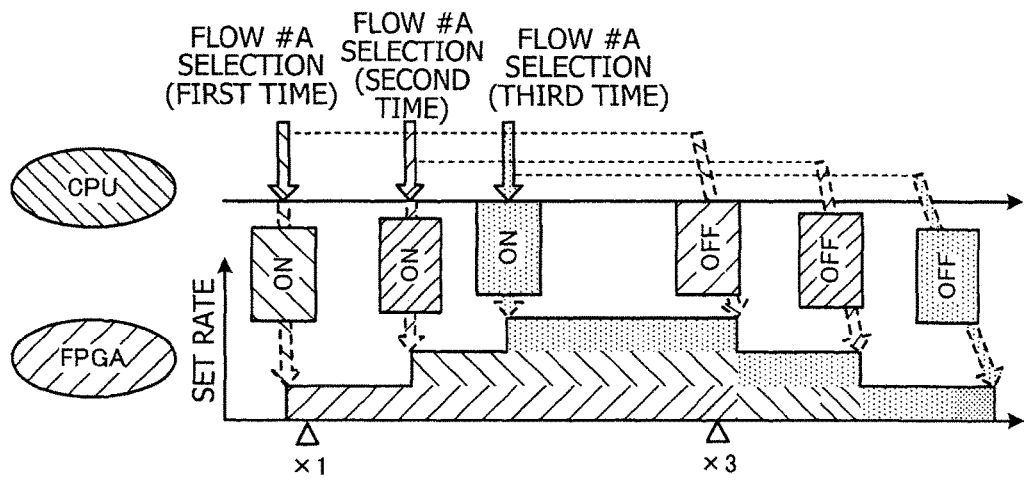
FIG. 22B is an explanatory view illustrating an example of a token addition timing when an OFF state of a selection flow for first to third times is delayed.

FIG. 22B is an explanatory view illustrating an example of a token addition timing when an OFF state of a selection flow for first to third times is delayed. The selection flow may be the selection flow #A illustrated in FIG. 22A. It is assumed that the determination unit 45 adopts the output pattern of the high rate within output ON sections of the selection flow #A for the first to third times. Thereupon, an output OFF state of the selection flow #A for the first to third times is delayed, and the bandwidth controlling unit 24 adds tokens of three times in response to arrival of an addition period to the token bucket 24B of the selection flow #A. However, an error caused by control delay occurs only within one section from among the three output ON sections. As the overlapping degree of output ON sections increases, the number of output ON sections in which no error occurs even if control delay occurs increases, and therefore, the influence of error may be moderated relatively.

In the following, action of the transmission apparatus 1 of the fifth embodiment is described. FIG. 23 is a flow chart illustrating an example of processing action of a determination unit relating to an output pattern determination process. The determination unit may be the determination unit 45 illustrated in FIG. 20. Referring to FIG. 23, the determination unit 45 decides whether or not a selection notification (output ON) of the selection flow is detected from the SCH 31 (operation S71). If a selection notification (output ON) of the selection flow is detected (Yes in operation S71), the determination unit 45 acquires the traffic amount of the selection flow (operation S72) and decides whether or not the traffic amount is the high rate (operation S73). If the traffic amount is the high rate (Yes in operation S73), the determination unit 45 notifies the magnification controlling unit 41C of the output pattern of the high rate (operation S74) and ends the processing action illustrated in FIG. 23.

If the traffic amount of the selection flow is not the high rate (No in operation S73), the determination unit 45 decides whether or not the traffic amount is the low rate (operation S75). If the traffic amount is the low rate (Yes in operation S75), the determination unit 45 notifies the magnification controlling unit 41C of the output pattern of the low rate (operation S76) and ends the processing action illustrated in FIG. 23.

If the traffic amount is not the low rate (No in operation S75), the determination unit 45 decides that the traffic amount is the medium rate and notifies the magnification controlling unit 41C of the output pattern of the medium rate (operation S77) and ends the processing action illustrated in FIG. 23. If a selection notification of the selection flow is not detected (No in operation S71), the determination unit 45 ends the processing action illustrated in FIG. 23.

When the traffic amount of the selection flow is the high rate, the determination unit 45 adopts the output pattern of the high rate from among the plurality of output patterns of the shaping rate and notifies the magnification controlling unit 41C of the output pattern of the high rate. As a result, shaping ready for the traffic amount of the high rate may be implemented.

When the traffic amount of the selection flow is the medium rate, the determination unit 45 adopts the output pattern of the medium rate from among the plurality of output patterns of the shaping rate and notifies the magnification controlling unit 41C of the output pattern of the medium rate. As a result, shaping ready for the traffic amount of the medium rate may be implemented.

When the traffic amount of the selection flow is the low rate, the determination unit 45 adopts the output pattern of the low rate from among the plurality of output patterns of the shaping rate and notifies the magnification controlling unit 41C of the output pattern of the low rate. As a result, shaping ready for the traffic amount of the low rate may be implemented.

Figure 24:
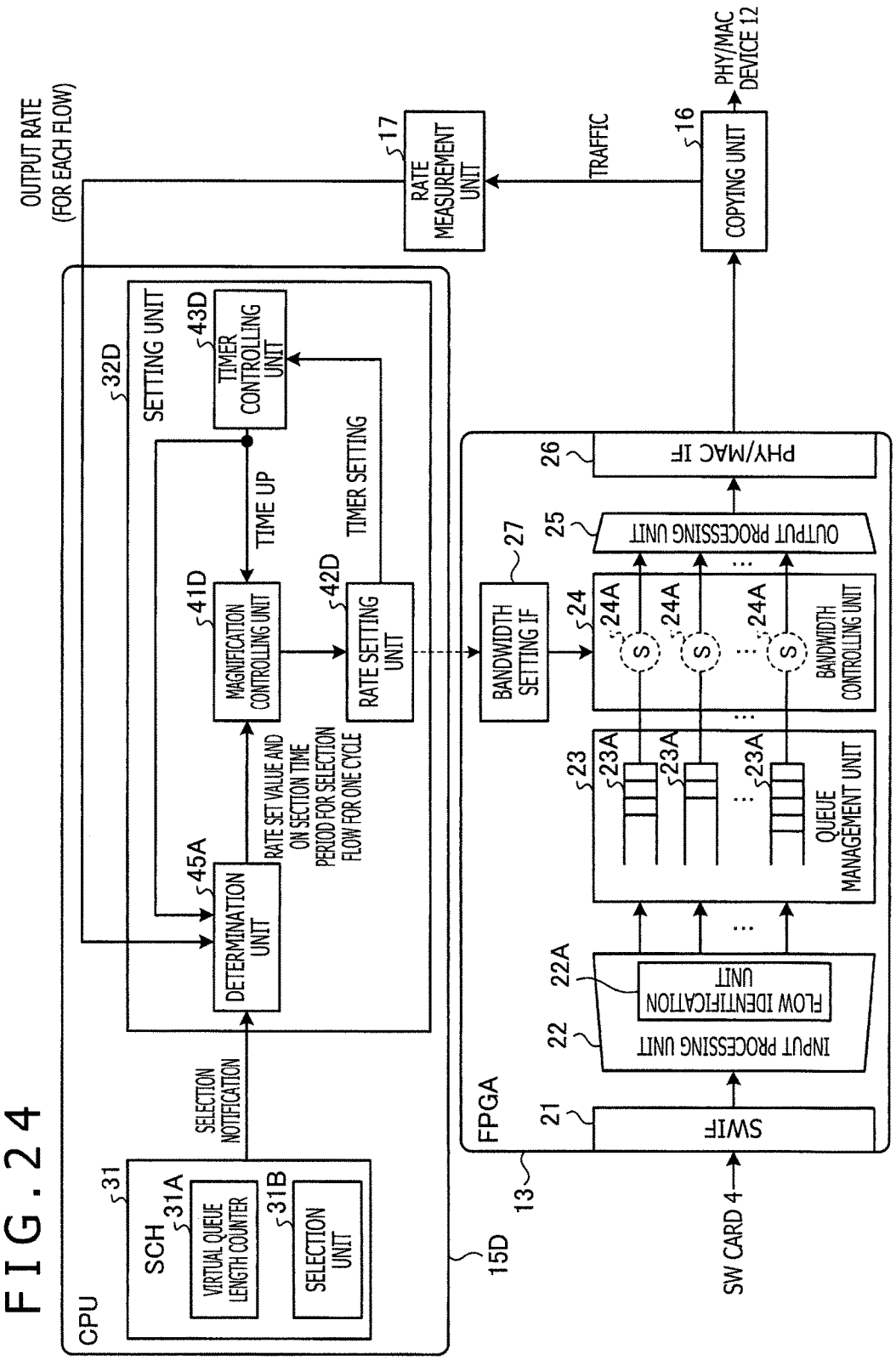
FIG. 24 is an explanatory view depicting an example of an FPGA and a CPU in an IF card of a sixth embodiment.

It is to be noted that, while, in the transmission apparatus 1 of the fifth embodiment described above, the traffic amount is acquired for each selection flow, acquisition of a traffic amount is not limited to such an embodiment but may be changed suitably. Accordingly, such an embodiment as just mentioned is described in the following as the sixth embodiment. FIG. 24 is an explanatory view depicting an example of an FPGA and a CPU in an IF card of the sixth embodiment. It is to be noted that same elements to those of the transmission apparatus 1 of the fifth embodiment are denoted by same reference symbols and overlapping description of the configuration and action of them is omitted herein.

Sixth Embodiment

The IF card 3 includes a copying unit 16 and a rate measurement unit 17 in addition to the plurality of optical modules 11, the PHY/MAC device 12, the FPGA 13, the memory 14 and a CPU 15D. The copying unit 16 is disposed at the output stage of the output processing unit 25 of the FPGA 13 and copies the traffic of a selection flow outputted to the output stage. The rate measurement unit 17 measures the output rate for each selection flow based on the traffic of the selection flow copied by the copying unit 16. A setting unit 32D includes a magnification controlling unit 41D, a rate setting unit 42D, a timer controlling unit 43D and a determination unit 45A.

The determination unit 45A compares the output rate of a selection flow that is a result of measurement of the rate measurement unit 17 and a set rate for the selection flow with each other and estimates a delay fluctuation based on a result of the comparison. The determination unit 45A determines an output pattern for each selection flow based on the delay fluctuation for the selection flow.

When the delay fluctuation of the selection flow is small, the determination unit 45A adopts the output pattern of the high rate from among the plurality of output patterns of the shaping rate. The output pattern of the high rate is such that, for example, the amount of set rate is 2.5 k bytes and the output ON section occurs once (0.01 milliseconds). When the delay fluctuation of the selection flow is medium, the determination unit 45A adopts the output pattern of the medium rate from among the plurality of output patterns of the shaping rate. The output pattern of the medium rate is such that, for example, the amount of set rate is 250 bytes and the output ON section occurs 10 times (0.1 milliseconds).

When the delay fluctuation of the selection flow is great, the determination unit 45A adopts the output pattern of the low rate from among the plurality of output patterns of the shaping rate. The output pattern of the row rate is such that, for example, the amount of set rate is 25 bytes and the output ON section appears 100 times (1 millisecond).

Figure 25A:
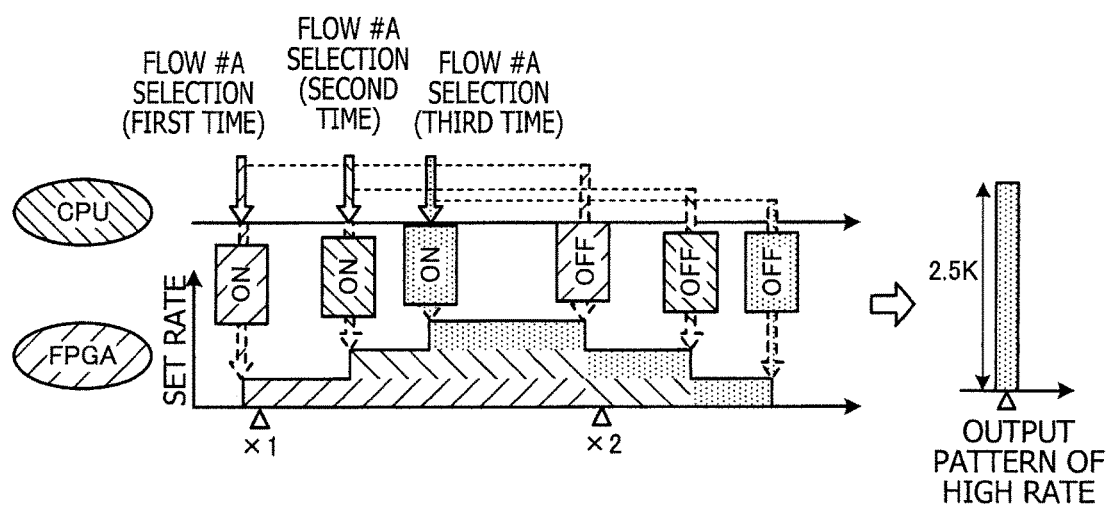
FIG. 25A is an explanatory view illustrating an example of an overlapping action of output patterns of a high rate of a CPU and an FPGA where a delay fluctuation is small.

FIG. 25A is an explanatory view illustrating an example of an overlapping action of output patterns of a high rate of a CPU and an FPGA where a delay fluctuation is small. The CPU and the FPGA may be the CPU 15D and the FPGA 13 illustrated in FIG. 24. It is assumed that the determination unit 45A decides based on a result of measurement of the rate measurement unit 17 that the delay fluctuation of the selection flow #A is small and adopts the output pattern of the high rate. The determination unit 45A notifies the magnification controlling unit 41D of the adopted output pattern of the high rate. If a selection notification (output ON) of the selection flow #A for the first time is detected from the SCH 31, the magnification controlling unit 41D increments the setting magnification for the shaping rate by +1 and notifies the rate setting unit 42D of the setting magnification (one time) and the output pattern of the high rate. The rate setting unit 42D sets the output pattern of the high rate and the setting magnification (one time) to the bandwidth controlling unit 24 in the FPGA 13 and notifies the timer controlling unit 43D of the timer setting of the selection flow #A for the first time. Thereupon, the bandwidth controlling unit 24 adds tokens of one time in response to arrival of an addition period to the token bucket 24B of the selection flow #A.

If a selection notification (output ON) of the selection flow #A for the second time is detected within the output ON section of the selection flow #A for the first time, the magnification controlling unit 41D increments the setting magnification for the shaping rate by +1. The magnification controlling unit 41D notifies the rate setting unit 42D of the setting magnification (two times) and the output pattern of the high rate. The rate setting unit 42D sets the output pattern of the high rate and the setting magnification (two times) to the bandwidth controlling unit 24 in the FPGA 13 and notifies the timer controlling unit 43D of the timer setting of the selection flow #A for the second time.

Further, if a selection notification (output ON) of the selection flow #A for the third time is detected within the output ON sections of the selection flow #A for the first and second times, the magnification controlling unit 41D increments the setting magnification for the shaping rate by +1. The magnification controlling unit 41D notifies the rate setting unit 42D of the output pattern of the high rate and the setting magnification (three times). The rate setting unit 42D sets the output pattern of the high rate and the setting magnification (three times) to the bandwidth controlling unit 24 in the FPGA 13 and notifies the timer controlling unit 43D of the timer setting of the selection flow #A for the third time.

If a time up notification of the selection flow #A for the first time is detected from the timer controlling unit 43D, the magnification controlling unit 41D decrements the setting magnification for the shaping rate by 1 and notifies the rate setting unit 42D of the setting magnification (two times) and the output pattern of the high rate. The rate setting unit 42D sets the output pattern of the high rate and the setting magnification (two times) to the bandwidth controlling unit 24 in the FPGA 13. Thereupon, the bandwidth controlling unit 24 adds tokens of two times in response to arrival of an addition period to the token bucket 24B of the selection flow #A.

If a time up notification of the selection flow #A for the second time is detected from the timer controlling unit 43D, the magnification controlling unit 41D decrements the setting magnification for the shaping rate by 1 and notifies rate setting unit 42D of the setting magnification (one time) and the output pattern of the high rate. The rate setting unit 42D sets the output pattern of the high rate and the setting magnification (one time) to the bandwidth controlling unit 24 in the FPGA 13. If a time up notification of the selection flow #A for the third time is detected from the timer controlling unit 43D, the magnification controlling unit 41D decrements the setting magnification for the shaping rate by 1 and notifies the rate setting unit 42D of the setting magnification (zero times) and the output pattern of the high rate. The rate setting unit 42D sets the output pattern of the high rate and the setting magnification (zero times) to the bandwidth controlling unit 24 in the FPGA 13.

Figure 25B:
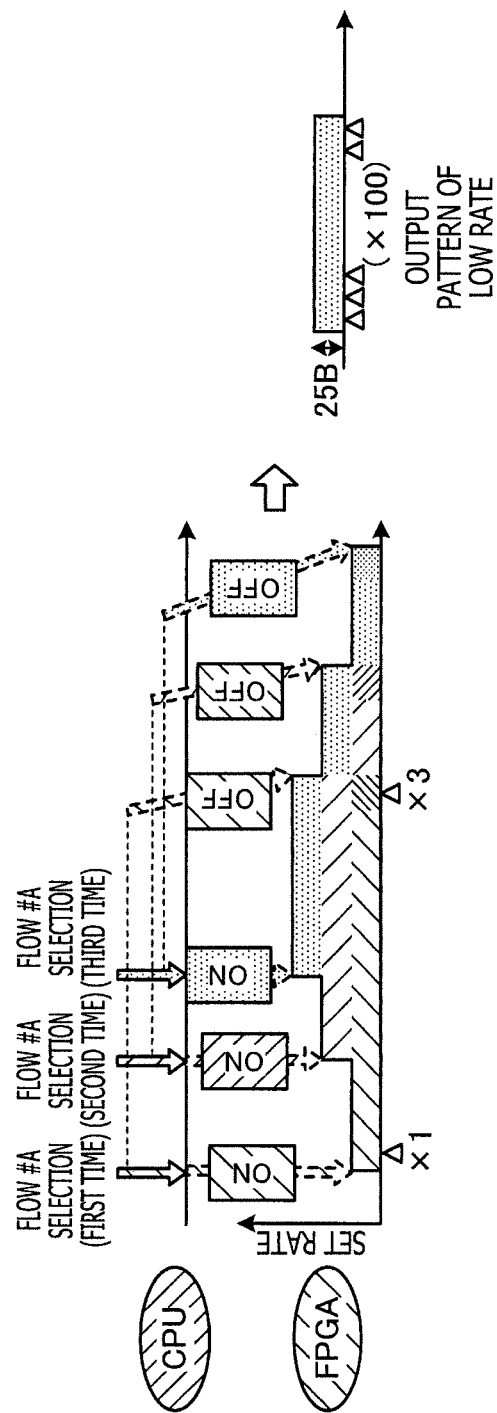
FIG. 25B is an explanatory view illustrating an example of an overlapping action of output patterns of a low rate of a CPU and an FPGA where a delay fluctuation is great.

FIG. 25B is an explanatory view illustrating an example of an overlapping action of output patterns of a low rate of a CPU and an FPGA where a delay fluctuation is great. The CPU and the FPGA are the CPU and the FPGA illustrated in FIG. 24. It is assumed that, when the delay fluctuation of the selection flow #A is great based on a result of measurement of the rate measurement unit 17, the determination unit 45A adopts the output pattern of the low rate. Even if an output OFF state of the selection flow #A for the first to third times is delayed within the output ON sections of the selection flow #A for the first to third times, since the determination unit 45A adopts the output pattern of the low rate, the error caused by the control delay is small and the influence of the error may be moderated.

The transmission apparatus 1 of the sixth embodiment determines an output pattern of a shaping rate for each selection flow based on a delay fluctuation for each selection flow. As a result, an optimum output pattern may be automatically set in response to a situation of the delay fluctuation.

When the delay fluctuation of the selection flow is small, the transmission apparatus 1 uses the output pattern of the high rate from among the plurality of output patterns of the shaping rate. As a result, shaping ready for a case where the delay fluctuation is small may be implemented.

When the delay fluctuation of the selection flow is great, the transmission apparatus 1 uses the output pattern of the low rate from among the plurality of output patterns of the shaping rate. As a result, shaping ready for a case where the delay fluctuation is great may be implemented.

When the delay fluctuation of the selection flow is medium, the transmission apparatus 1 uses the output pattern of the medium rate from among the plurality of output patterns of the shaping rate. As a result, shaping ready for a case where the delay fluctuation is medium may be implemented.

Seventh Embodiment

Figure 26:
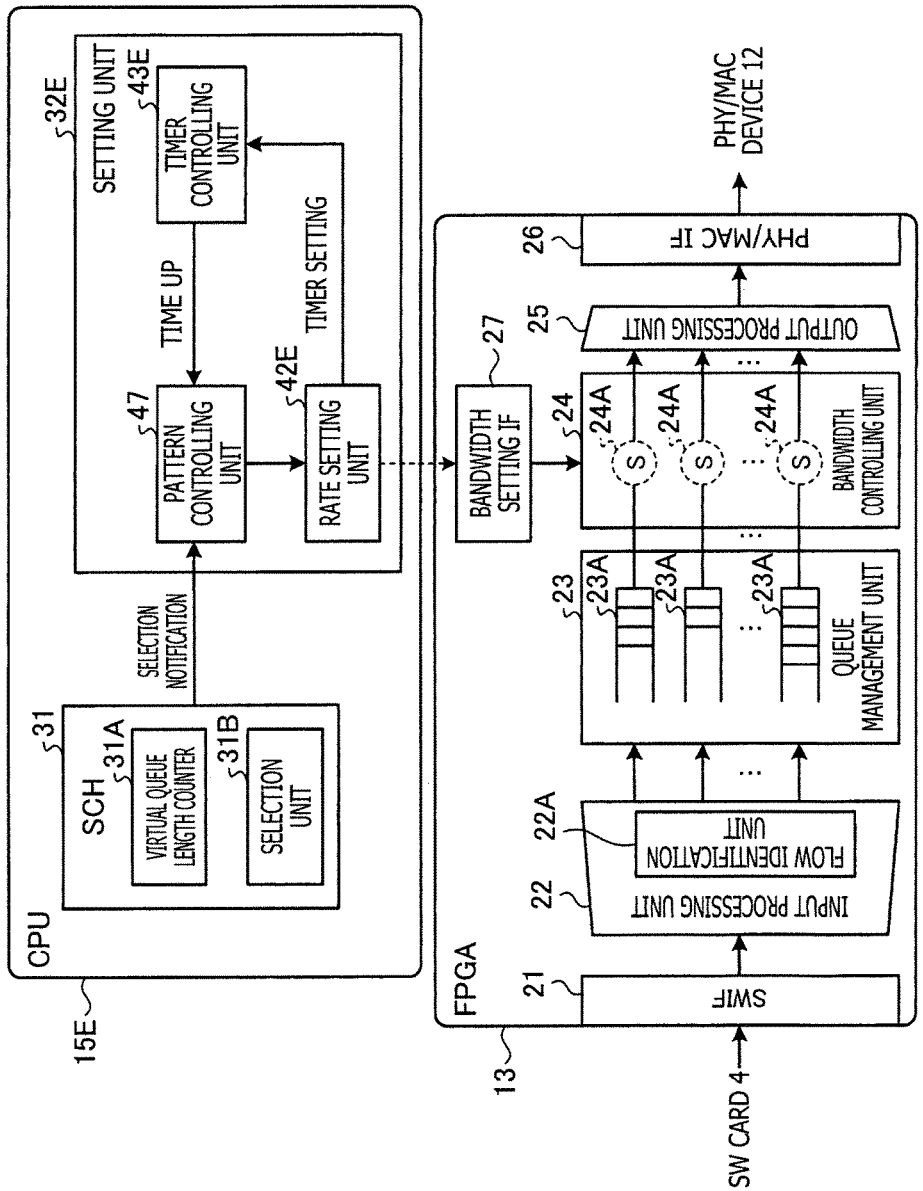
FIG. 26 is an explanatory view depicting an example of an FPGA and a CPU in an IF card of a seventh embodiment.

FIG. 26 is an explanatory view depicting an example of an FPGA and a CPU in an IF card of the seventh embodiment. It is to be noted that same elements to those of the transmission apparatus 1 of the second embodiment are denoted by same reference symbols and overlapping description of the configuration and action of them is omitted herein. A setting unit 32E in a CPU 15E includes a pattern controlling unit 47, a rate setting unit 42E and a timer controlling unit 43E. The pattern controlling unit 47 increments the number of overlapping times by +1 in response to a selection notification (output ON) of a selection flow. When the number of overlapping times of the selection flow is zero times to one time, the pattern controlling unit 47 adopts, as the output pattern of the shaping rate of the selection flow, an output pattern in which, for example, the amount of set rate is 4 Mbps and the output ON section is 5 milliseconds. Further, the pattern controlling unit 47 notifies the rate setting unit 42E of the adopted output pattern.

When the number of overlapping times of the selection flow is two, the pattern controlling unit 47 adopts, as an output pattern of the shaping rate of the selection flow, an output pattern in which, for example, the amount of set rate is 8 Mbps and the output ON section is 2.5 milliseconds. The pattern controlling unit 47 notifies the rate setting unit 42E of the output pattern. The pattern controlling unit 47 adopts, as an output pattern of the shaping rate of the selection flow where the number of overlapping times of the selection flow is equal to or greater than three, an output pattern in which, for example, the amount of set rate is 16 Mbps and the output ON section is 1.25 milliseconds. The pattern controlling unit 47 notifies the rate setting unit 42E of the output pattern.

When the output pattern of the selection flow is set to the bandwidth setting IF 27, the rate setting unit 42E notifies the timer controlling unit 43E of the timer setting. When the timer setting is detected, the timer controlling unit 43E starts the ON section timer for the output pattern of the selection flow. If the ON section timer of the output pattern of the selection flow times out, the timer controlling unit 43E notifies the pattern controlling unit 47 of a time up notification. The pattern controlling unit 47 decrements the number of overlapping times of the selection flow by 1 in response to the time up notification and notifies the rate setting unit 42E of the output pattern according to the number of overlapping times.

Figure 27:
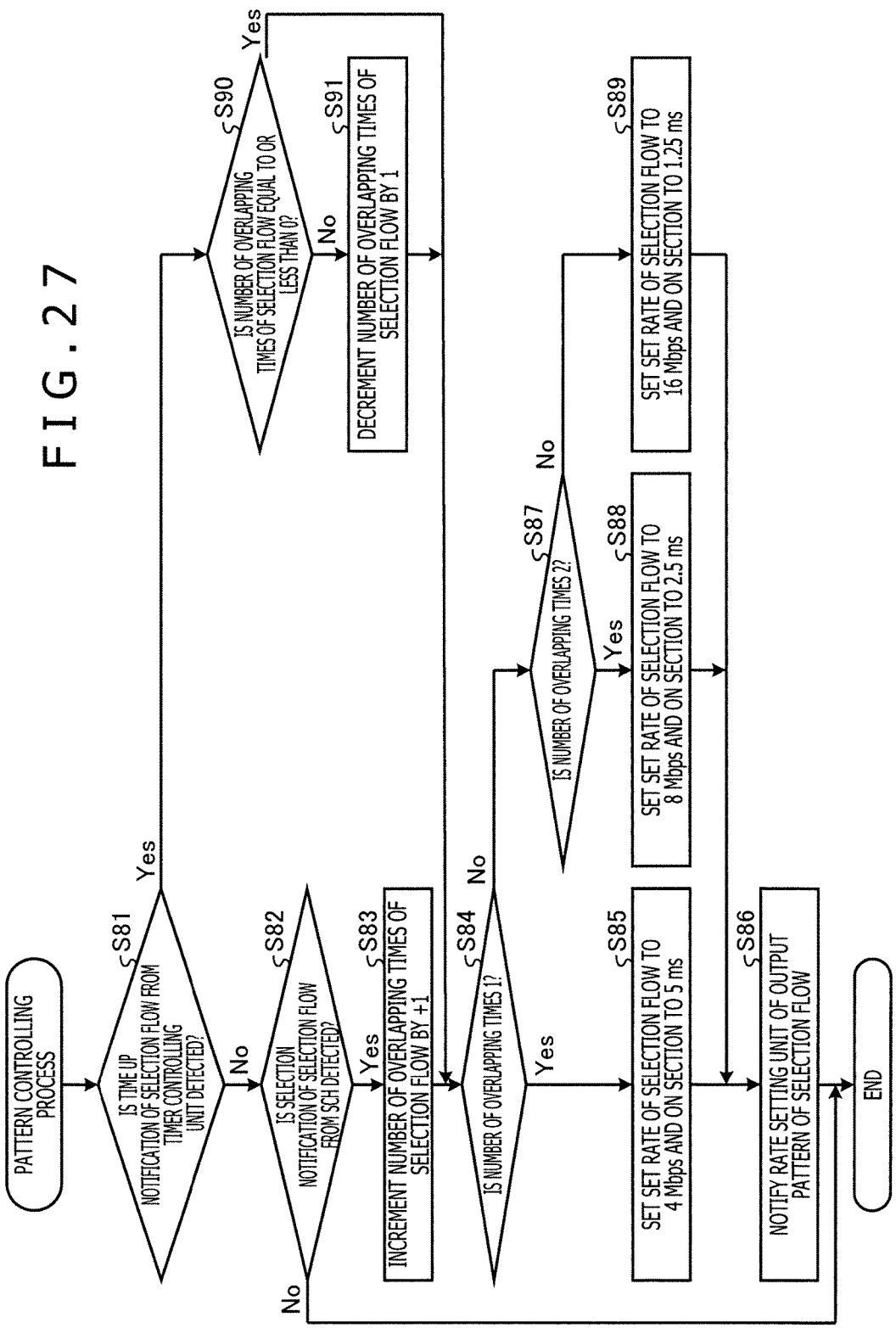
FIG. 27 is a flow chart illustrating an example of processing action of a pattern controlling unit relating to a pattern controlling process.

Action of the transmission apparatus 1 of the seventh embodiment is described below. FIG. 27 is a flow chart illustrating an example of processing action of a pattern controlling unit relating to a pattern controlling process. The pattern controlling unit may be the pattern controlling unit 47 illustrated in FIG. 26. The pattern controlling unit 47 decides whether or not a time up notification of the selection flow is detected from the timer controlling unit 43E (operation S81). If a time up notification of the selection flow is not detected (No in operation S81), the pattern controlling unit 47 decides whether or not a selection notification (output ON) of the selection flow is detected from the SCH 31 (operation S82).

If a selection notification (output ON) of the selection flow is detected (Yes in operation S82), the pattern controlling unit 47 increments the number of overlapping times of the selection flow by +1 (operation S83) and decides whether or not the number of overlapping times is one (operation S84). If the number of overlapping times is one (Yes in operation S84), the pattern controlling unit 47 sets the amount of set rate of the output pattern of the selection flow to 4 Mbps and sets the output ON section to 5 milliseconds (operation S85). Then, the pattern controlling unit 47 notifies the rate setting unit 42E of the output pattern of the selection flow (operation S86) and ends the processing action illustrated in FIG. 27.

If the number of overlapping times of the selection flow is not one (No in operation S84), the pattern controlling unit 47 decides whether or not the number of overlapping times of the selection flow is two (operation S87). If the number of overlapping times of the selection flow is two (Yes in operation S87), the pattern controlling unit 47 sets the amount of set rate of the output pattern of the selection flow to 8 Mbps and sets the output ON section to 2.5 milliseconds (operation S88). Then, the pattern controlling unit 47 advances the processing to operation S86 in order to notify the rate setting unit 42E of the output pattern of the selection flow.

If the number of overlapping times of the selection flow is not two (No in operation S87), the pattern controlling unit 47 decides that the number of overlapping times is equal to or greater than three and sets the amount of set rate of the output pattern of the selection flow to 16 Mbps and further sets the output ON section to 1.25 milliseconds (operation S89). Then, the pattern controlling unit 47 advances the processing to operation S86 in order to notify the rate setting unit 42E of the output pattern of the selection flow.

If a time up notification of the selection flow is detected (Yes in operation S81), the pattern controlling unit 47 decides whether or not the number of overlapping times of the selection flow is equal to or less than zero (operation S90). If the number of overlapping times of the selection flow is not equal to or less than zero (No in operation S90), the pattern controlling unit 47 decrements the number of overlapping times of the selection flow by 1 (operation S91) and advances the processing to operation S84 in order to decide whether or not the number of overlapping times of the selection flow is one. If the number of overlapping times of the selection flow is equal to or less than zero (Yes in operation S90), the pattern controlling unit 47 advances the processing to operation S84 in order to decide whether or not the number of overlapping times of the selection flow is one. If a selection notification (output ON) of the selection flow is not detected (No in operation S82), the pattern controlling unit 47 ends the processing action illustrated in FIG. 27.

If the number of overlapping times of the selection flow is one, the pattern controlling unit 47 sets the amount of set rate of the output pattern of the shaping rate to 4 Mbps and sets the output ON section to 5 milliseconds. Further, when the number of overlapping times of the selection flow is two, the pattern controlling unit 47 sets the amount of set rate of the output pattern of the shaping rate to 8 Mbps and sets the output ON section to 2.5 milliseconds. Furthermore, when the number of overlapping times of the selection flow is three or more, the pattern controlling unit 47 sets the amount of set rate of the output pattern of the shaping rate to 16 Mbps and sets the output ON section to 1.25 milliseconds. As a result, shaping may be implemented with an output pattern of a high rate that increases as the number of overlapping times of the selection flow increases.

Figure 28:
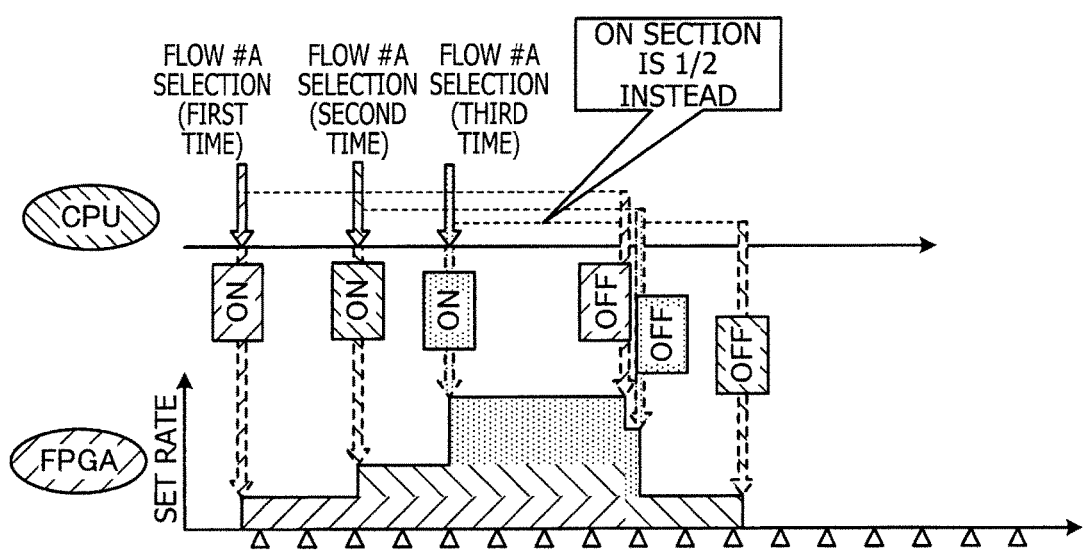
FIG. 28 is an explanatory view illustrating an example of token addition timings of a CPU and an FPGA.

It is to be noted that, in the transmission apparatus 1 of the seventh embodiment described above, every time an output ON section of a selection flow times out, the number of overlapping times of the selection flow is decremented by one and an output pattern of an amount of set rate and an output ON section according to the number of overlapping times after decremented by 1 is adopted. However, adoption of an output pattern is not limited to this and may be changed suitably. FIG. 28 is an explanatory view illustrating an example of token addition timings of a CPU and an FPGA. The CPU and the FPGA may be the CPU 15E and the FPGA 13 illustrated in FIG. 26.

For example, when the setting unit 32E detects a selection notification (output ON) of the selection flow #A for the first time, since the number of overlapping times of the selection flow is one, the setting unit 32E sets, as the output pattern of the selection flow #A, the amount of set rate to 4 Mbps and sets the output ON section to 5 milliseconds. If the setting unit 32E detects a selection notification (output ON) of the selection flow #A for the second time within the output ON section of the selection flow #A for the first time, the number of overlapping times of the selection flow #A becomes two. The setting unit 32E sets, as the output pattern of the selection flow #A, the amount of set rate to 4 Mbps and sets the output ON section to 5 milliseconds. If the setting unit 32E detects a selection notification (output ON) of the selection flow #A for the third time within the output ON sections of the selection flow #A for the first and second times, the number of overlapping times of the selection flow #A becomes three. Then, the setting unit 32E sets, as the output pattern of the selection flow #A, the amount of set rate to 8 Mbps and sets the output ON section to 2.5 milliseconds.

If the selection flow #A for the first time becomes an output OFF state, the setting unit 32E sets the amount of set rate of the selection flow #A to 12 Mbps by subtracting 4 Mbps from 16 Mbps. Further, when the selection flow #A for the third time becomes an output OFF state, the setting unit 32E sets the amount of set rate of the selection flow #A to 4 Mbps by subtracting 8 Mbps from 12 Mbps. Furthermore, when the selection flow #A for the second time becomes an output OFF state, the setting unit 32E sets the amount of set rate of the selection flow #A to 0 by subtracting 4 Mbps from 4 Mbps.

It is to be noted that an output pattern of the shaping rate of a selection flow is determined based on, in the transmission apparatus 1 of the sixth embodiment described above, the traffic amount of the selection flow, and in the transmission apparatus 1 of the seventh embodiment, the delay fluctuation of the selection flow. However, determination of an output pattern is not limited to them, and an output pattern may be determined based on a condition for each flow such as the setting magnification at present, an allowable output delay or an error.

Although the transmission apparatus 1 of the present embodiment is exemplified as a transmission apparatus of the chassis type, it may be applied also to a transmission apparatus of the pizza box type.

While the transmission apparatus 1 is exemplified as a packet transmission apparatus that transmits a variable length packet, it may be applied also to a transmission apparatus that transmits a fixed length packet. Furthermore, the transmission apparatus 1 is not limited to a transmission apparatus that transmits packets but may be applied also to a transmission apparatus that transmits data, for example, in a variable or fixed length data unit.

While, in the transmission apparatus 1 of the sixth and seventh embodiments, three different output patterns of the high rate, medium rate and low rate output patterns, are exemplified, the output patterns are not limited to them, but four or more output patterns may be applied and may be changed suitably.

While, in the transmission apparatus 1 of the above-described embodiments, the shaping rate of the shaper 24A for each selection flow is controlled, on-off control of the shaper 24A for each selection flow may be applied alternatively. Also in this case, priority control may be implemented by on-off control of the shaper 24A for each selection flow.

Further, the components of the units depicted in the drawings may not necessarily be configured physically as depicted in the drawings. For example, particular forms of disintegration and integration of the units are not limited to those depicted in the drawings, and all or some of them may be disintegrated or integrated functionally or physically in an arbitrary unit in response to various loads, use situations and so forth.

Furthermore, the various functions performed by the various apparatus may be executed entirely or at arbitrary part thereof by a CPU (or a microcomputer such as a micro processing unit (MPU) or a micro controller unit (MCU)). Further, it is a matter of course that the various processing functions may be executed entirely or at arbitrary part thereof by a program that is analyzed and executed by a CPU (or a microcomputer such as an MPU or an MCU) or by hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus, comprising:
    at least one memory in which first data including first destination information and second data including second destination information are stored; and
    at least one processor coupled to the at least one memory and configured to control the at least one memory to output one of the first data and the second data at an output rate according to a priority degree by adjusting, for each of the first destination information and the second destination information, the output rate at which one of the first data and the second data is outputted and an output ON section within which the one of the first data and the second data is output.

2. The transmission apparatus according to claim 1, wherein the at least one processor is configured to set the output ON section for each of the first destination information and the second destination information to a multiple of an addition period for which a token is added to a token bucket.

3. The transmission apparatus according to claim 1, wherein the at least one processor is configured to:
    increase, when the one of the first data and the second data is outputted within the output ON section and same data as the one of the first data and the second data is determined to be outputted, the output rate of the one of the first data and the second data, and
    decrease, when the one of the first data and the second data is outputted within the output ON section and the same data as the one of the first data and the second data is determined to be not outputted, the output rate of the one of the first data and the second data.

4. The transmission apparatus according to claim 1, wherein the at least one processor is configured to:
    count a number of detected times by which a first one of the first data and the second data is outputted in the output ON section and same data as the first one of the first data and the second data is determined to be outputted in a predetermined period of time,
    increase the output rate of the first one of the first data and the second data according to the number of detected times, and
    decrease the output rate of a second one of the first data and the second data, different from the first one.

5. The transmission apparatus according to claim 1, wherein the at least one processor is configured to:
    count a number of detected times by which a first one of the first data and the second data is outputted in the output ON section and same data as the one of the first data and the second data is determined to be outputted in a predetermined period of time, and
    when the number of detected times exceeds a predetermined value,
        increase the output rate of the first one of the first data and the second data according to the number of detected times, and
        decrease the output rate of a second one of the first data and the second data, different from the first one.

6. The transmission apparatus according to claim 1, wherein the at least one processor is configured to determine patterns in which each of output rates and each of output ON sections of the one of the first data and the second data are different and output amounts determined by the output rates and the output ON sections are same, based on a traffic amount of the one of the first data and the second data.

7. The transmission apparatus according to claim 1, wherein the at least one processor is configured to determine patterns in which each of output rates and each of output ON sections of the one of the first data and the second data are different and output amounts determined by the output rates and the output ON sections are same, based on delay fluctuation of the one of the first data and the second data.

8. The transmission apparatus according to claim 1, wherein the at least one processor is configured to:
    count, when the one of the first data and the second data is outputted within the output ON section and same data as the one of the first data and the second data is determined to be outputted, a number of overlapping times by which the same data is determined to be outputted,
    determine patterns in which each of output rates and each of output ON sections of the one of the first data and the second data are different and output amounts determined by the output rates and the output ON sections are same, according to the number of overlapping times, and
    control the output rate according to the patterns.

9. A transmission processing method, comprising:
    controlling at least one memory in which first data including first destination information and second data including second destination information are stored to output one of the first data and the second data stored in the at least one memory at an output rate; and
    controlling the output rate of the one of the first data and the second data according to a priority degree, by a processor adjusting, for each of the first destination information and the second destination information, the output rate at which the one of the first data and the second data is outputted and an output ON section within which the one of the first data and the second data is output.

* * * * *